(12) United States Patent
Shipman

(10) Patent No.: US 12,460,230 B2
(45) Date of Patent: Nov. 4, 2025

(54) MODIFIED MITOCHONDRION AND METHODS OF USE THEREOF

(71) Applicant: The J. David Gladstone Institutes, a Testamentary Trust Established Under the Will of J. David Gladstone, San Francisco, CA (US)

(72) Inventor: Seth Shipman, San Francisco, CA (US)

(73) Assignee: The J. David Gladstone Institutes, San Francisco, CA (US)

( * ) Notice: Subject to any disclaimer, the term of this patent is extended or adjusted under 35 U.S.C. 154(b) by 996 days.

(21) Appl. No.: 17/429,280

(22) PCT Filed: Feb. 10, 2020

(86) PCT No.: PCT/US2020/017462
§ 371 (c)(1),
(2) Date: Aug. 6, 2021

(87) PCT Pub. No.: WO2020/163856
PCT Pub. Date: Aug. 13, 2020

(65) Prior Publication Data
US 2022/0145330 A1 May 12, 2022

Related U.S. Application Data

(60) Provisional application No. 62/803,546, filed on Feb. 10, 2019.

(51) Int. Cl.
*C12N 15/87* (2006.01)
*A61K 35/12* (2015.01)
*A61K 38/16* (2006.01)
*C07K 14/47* (2006.01)

(52) U.S. Cl.
CPC .............. *C12N 15/87* (2013.01); *A61K 35/12* (2013.01); *A61K 38/164* (2013.01); *C07K 14/47* (2013.01)

(58) Field of Classification Search
CPC ...... C12N 15/87; A61K 35/12; A61K 38/164; C07K 14/47
See application file for complete search history.

(56) References Cited

U.S. PATENT DOCUMENTS

| | | | |
|---|---|---|---|
| 2013/0149778 A1 | 6/2013 | Chang et al. | |
| 2018/0036344 A1* | 2/2018 | Wu | A61K 47/6455 |

FOREIGN PATENT DOCUMENTS

| | | |
|---|---|---|
| WO | 2016138420 | 9/2016 |
| WO | WO-2016138420 A1 | 9/2016 |
| WO | 2019028469 | 2/2019 |
| WO | WO-2019028469 A1 | 2/2019 |
| WO | 2019209051 | 10/2019 |
| WO | WO-2019209051 A1 | 10/2019 |
| WO | 2020163856 | 8/2020 |
| WO | WO-2020163856 A1 | 8/2020 |

OTHER PUBLICATIONS

Kami, D., and Gojo, S., "From Cell Entry to Engraftment of Exogenous Mitochondria," Int J Mol Sci . Jul. 15, 2020;21(14):4995. doi: 10.3390/ijms21144995. (Year: 2020).*
Heineman, B. D., et al., "Targeted Mitochondrial Delivery to Hepatocytes: A Review," J Clin Transl Hepatol 10(2):321-328. doi: 10.14218/JCTH.2021.00093. Epub Oct. 19, 2021. (Year: 2021).*
Tachibana, M., et al., "Towards germline gene therapy of inherited mitochondrial diseases," Nature 493(7434): 627-631. doi: 10.1038/nature11647. (Year: 2013).*
Borcherding, N., and Brestoff, J. R., "The power and potential of mitochondria transfer," Nature 623(7986): 283-291. doi: 10.1038/s41586-023-06537-z. (Year: 2023).*
Caicedo, A., et al., "Artificial Mitochondria Transfer: Current Challenges, Advances, and Future Applications," Stem Cells Int. 2017: 2017:7610414. doi: 10.1155/2017/7610414. (Year: 2017).*
Gollihue, J. L., et al., "Effects of Mitochondrial Transplantation on Bioenergetics, Cellular Incorporation, and Functional Recovery after Spinal Cord Injury," J Neurotrauma 35(15):1800-1818. doi: 10.1089/neu.2017.5605. (Year: 2018).*
Kesner, E. E., et al., "Characteristics of Mitochondrial Transformation into Human Cells," Sci Rep. 17:6:26057. doi: 10.1038/srep26057. (Year: 2016).*
Kornmann, B., et al., "An ER-mitochondria tethering complex revealed by a synthetic biology screen," Science 325(5939):477-481. doi: 10.1126/science.1175088. (Year: 2009).*
McWilliams, T. G., et al., "mito-QC illuminates mitophagy and mitochondrial architecture in vivo," J Cell Biol 214(3):333-345. doi: 10.1083/jcb.201603039. (Year: 2016).*
Harmansa, S., et al., "Dpp spreading is required for medial but not for lateral wing disc growth," Nature 527(7578):317-322. doi: 10.1038/nature15712. (Year: 2015).*
"International Application Serial No. PCT/US2020/017462, International Search Report mailed Jul. 9, 2020", 6 pgs.
"International Application Serial No. PCT/US2020/017462, Written Opinion mailed Jul. 9, 2020", 6 pgs.
Kanaji, Sachiko, et al., "Characterization of the Signal that Directs Tom20 to the Mitochondrial Outer Membrane", The Journal of Cell Biology, vol. 151 No. 2, (Oct. 16, 2000), 277-288.
Mossalam, Mohanad, et al., "Direct Induction of Apoptosis Using an Optimal Mitochondrially Targeted p53", Molecular Pharmaceutics, vol. 9, No. 5, (Mar. 1, 2012).
Park, Sungwoo, et al., "Targeting by AutophaGy Proteins (TAG): Targeting of IFNG-inducible GTPases to Membranes by the LC3 Conjugation System of Autophagy". Autophagy, vol. 12 No. 7, (May 12, 2016), 1153-1167.

(Continued)

*Primary Examiner* — Tracy Vivlemore
*Assistant Examiner* — Eric J Rogers
(74) *Attorney, Agent, or Firm* — Schwegman Lundberg & Woessner, P.A.

(57) ABSTRACT

Methods and compositions for introducing an exogenous mitochondrion harvested from a donor cell into a recipient cell are provided. Also provided are methods and compositions for producing a modified mitochondrion and treating mitochondrial disease in an individual with the mitochondrial disease. Further provided are modified mitochondria, genetically modified mitochondria, genetically modified cells, isolated compositions and pharmaceutical compositions for practicing the subject methods.

17 Claims, 10 Drawing Sheets

Specification includes a Sequence Listing.

(56) References Cited

OTHER PUBLICATIONS

"International Application Serial No. PCT US2020 017462, International Preliminary Report on Patentability mailed Aug. 19, 2021", 8 pgs.

Kanaji, Sachiko, "Characterization of the Signal that Directs Tom20 to the Mitochondrial Outer Membrane", The Journal of Cell Biology, vol. 151 No. 2, (Oct. 16, 2000), 277-288.

Mossalam, Mohanad, "Direct Induction of Apoptosis Using an Optimal Mitochondrially Targeted p53", Molecular Pharmaceutics, vol. 9, No. 5, (Mar. 1, 2012).

Park, Sungwoo, "Targeting by AutophaGy Proteins (TAG): Targeting of IFNG-inducible GTPases to Membranes by the LC3 Conjugation System of Autophagy", Autophagy, vol. 12 No. 7, (May 12, 2016), 1153-1167.

* cited by examiner mitoOM-Inv497 (Tomm20 full fusion):

MVGRNSAIAAGVCGALFIGYCIYFDRKRRSDPNFKNRLRERRKQKLAKERAGLSKLPDLKDAEAVQKFFLEEIQLGEELLAQGEYEKG
VDHLTNAIAVCGQPQQLLQVLQQTLPPPVFQMLLTKLPTISQRIVSAQSLAEDDVEGDPPVATNSFTLSVTVQQPQLTLTAAVIGDGAP
ANGKTAITVEFTVADFEGKPLAGQEVVITTNNGALPNKITEKTDANGVARIALTNTTDGVTVVTAEVEGQRQSVDTHFVKGTITADKST
LTAVPTSIIADGLMASTITLELKDTYGDPQAGANVAFDTTLGNMGVITDHNDGTYSAPLTSTTLGVATVTVKVDGAAFSVPSVTVNFTA
DPIPDAGRSSFTVSTPDILADGTMSSTLSFVPVDKNGHFISGMQGLSFTQNGVPVSISPITEQPDSYTATVVGNTAGDVTITPQVDTLI
LSTLQKKISLFPVPTLTGILVNGQNFATDKGFPKTIFKNATFQLQMDNDVANNTQYEWSSSFTPNVSVNDQGQVTITYQTYSEVAVTAK
SKKFPSYSVSYRFYPNRWIYDGGTSLVSSLEASRQCQGSDMSAVLESSRATNGTRAPDGTLWGEWGSLTAYSSDWQSGEYWVKKTSTDF
ETMNMDTGALVQGPAYLAFPLCALAI

FIG. 10A mitoOM-Inv497 (Tomm20 short fusion):

MVGRNSAIAAGVCGALFIGYCIYFDRKRRSDPNGDPPVATNSFTLSVTVQQPQLTLTAAVIGDGAPANGKTAITVEFTVADFEGKPLAG
QEVVITTNNGALPNKITEKTDANGVARIALTNTTDGVTVVTAEVEGQRQSVDTHFVKGTITADKSTLTAVPTSIIADGLMASTITLELK
DTYGDPQAGANVAFDTTLGNMGVITDHNDGTYSAPLTSTTLGVATVTVKVDGAAFSVPSVTVNFTADPIPDAGRSSFTVSTPDILADGT
MSSTLSFVPVDKNGHFISGMQGLSFTQNGVPVSISPITEQPDSYTATVVGNTAGDVTITPQVDTLILSTLQKKISLFPVPTLTGILVNG
QNFATDKGFPKTIFKNATFQLQMDNDVANNTQYEWSSSFTPNVSVNDQGQVTITYQTYSEVAVTAKSKKFPSYSVSYRFYPNRWIYDGG
TSLVSSLEASRQCQGSDMSAVLESSRATNGTRAPDGTLWGEWGSLTAYSSDWQSGEYWVKKTSTDFETMNMDTGALVQGPAYLAFPLCA
LAI

FIG. 10B

MODIFIED MITOCHONDRION AND METHODS OF USE THEREOF

PRIORITY

This application is a U. S. National Stage Filing under 35 U.S.C. 371 from International Patent Application Serial No. PCT/US2020/017462, filed Feb. 10, 2020, which application claims the benefit of priority to U.S. Provisional Patent Application No. 62/803,546, filed on Feb. 10, 2019, the disclosures of which are incorporated herein by reference in their entireties.

INTRODUCTION

The diseases that result from mutations in mitochondrial DNA (mtDNA) are both devastating and varied, consistent with the role of this organelle in meeting the energetic demands of every cell in our body. While some mutations exert their effects in infancy (e.g. Leigh syndrome), most diseases of mtDNA occur after a delay—emerging in childhood (e.g. Neuropathy ataxia retinitis pigmentosa (NARP)), teens (e.g. Leber hereditary optic neuropathy (LHON)), twenties (e.g. Chronic progressive external ophthalmoplegia (CPEO)), and thirties (e.g. mitochondrial diabetes), each with a substantial onset tail into the forties and beyond. Moreover, mutations to mtDNA are increasingly being considered as a susceptibility factor in common diseases like diabetes, neurodegenerative diseases like Parkinson's Disease, and the cellular decline that accompanies normal aging.

Treatment options are incredibly limited and—other than the extreme case of mitochondrial transplantation during in vitro fertilization—these diseases are not seen as candidates for cell or somatic gene therapy. The present disclosure addresses this need and provides related advantages.

SUMMARY

The present disclosure provides a method of introducing an exogenous mitochondrion harvested from a donor cell into a recipient cell. The method includes genetically modifying the donor cell to express a fusion protein, the fusion protein including: (i) a polypeptide capable of binding to an adhesion molecule on the recipient cell, and (ii) a polypeptide including a mitochondrial outer membrane targeting domain. The method further includes lysing the donor cell, isolating the exogenous mitochondrion from the donor cell, and contacting the recipient cell with the exogenous mitochondrion from the donor cell, wherein the exogenous mitochondrion is introduced into the recipient cell. The exogenous mitochondrion includes the fusion protein positioned in the outer membrane of the mitochondrion such that it is capable of binding to the adhesion molecule on the recipient cell.

The present disclosure further provides a method of producing a modified mitochondrion, the method including genetically modifying a donor cell to express a fusion protein, the fusion protein including: a polypeptide capable of binding to an adhesion molecule on a recipient cell; and a polypeptide comprising a mitochondrial outer membrane targeting domain; wherein the modified mitochondrion is produced and wherein the modified mitochondrion includes the fusion protein positioned in the outer membrane of the modified mitochondrion such that it is capable of binding to the adhesion molecule on the recipient cell.

The present disclosure further provides a method of producing a genetically modified mitochondrion, the method including genetically modifying a mitochondrion, wherein the mitochondrion includes a fusion protein, the fusion protein including: a polypeptide capable of binding to an adhesion molecule on a recipient cell; and a polypeptide comprising a mitochondrial outer membrane targeting domain; wherein the mitochondrion includes the fusion protein positioned in the outer membrane of the mitochondrion such that it is capable of binding to the adhesion molecule on the recipient cell.

The present disclosure further provides a method of introducing an exogenous mitochondrion harvested from a donor cell into a recipient cell, the method including contacting the recipient cell with the exogenous mitochondrion from the donor cell, wherein the exogenous mitochondrion includes a fusion protein including a polypeptide capable of binding to an adhesion molecule on the recipient cell; and a polypeptide comprising a mitochondrial outer membrane targeting domain; wherein the fusion protein is positioned in the outer membrane of the mitochondrion such that it is capable of binding to the adhesion molecule on the recipient cell; and wherein the exogenous mitochondrion is introduced into the recipient cell.

In addition to the provided methods, the present disclosure also provides a modified mitochondrion including a fusion protein including: a polypeptide capable of binding to an adhesion molecule on a recipient cell; and a polypeptide comprising a mitochondrial outer membrane targeting domain; wherein the modified mitochondrion includes the fusion protein positioned in the outer membrane of the modified mitochondrion such that it is capable of binding to the adhesion molecule on the recipient cell.

The present disclosure further provides a genetically modified eukaryotic cell that is not a human cell in vivo, including a modified mitochondrion including a fusion protein including: a polypeptide capable of binding to an adhesion molecule on a recipient cell; and a polypeptide comprising a mitochondrial outer membrane targeting domain; wherein the modified mitochondrion includes the fusion protein positioned in the outer membrane of the modified mitochondrion such that it is capable of binding to the adhesion molecule on the recipient cell.

The present disclosure further provides an isolated modified mitochondrion including a fusion protein including: a polypeptide capable of binding to an adhesion molecule on a recipient cell; and a polypeptide comprising a mitochondrial outer membrane targeting domain; wherein the modified mitochondrion comprises the fusion protein positioned in the outer membrane of the modified mitochondrion such that it is capable of binding to the adhesion molecule on the recipient cell.

The present disclosure further provides a fusion protein including: a polypeptide capable of binding to an adhesion molecule on a recipient cell; and a polypeptide comprising a mitochondrial outer membrane targeting domain. Nucleic acids encoding the fusion protein and plasmids comprising such nucleic acids are also provided.

Methods of treating a mitochondrial disease or disorder are also provided, which methods include administering a therapeutically effective amount of the modified mitochondrion as described herein or a cell comprising a modified mitochondrion as described herein.

BRIEF DESCRIPTION OF THE DRAWINGS

FIG. 10A provides the amino acid sequence for a fusion protein including the 145 N-terminal amino acids of Tomm20 (underlined) fused to the 497 C-terminal amino acids of invasin protein from *Yersinia pseudotuberculosis* (bolded). The GDPPVAT (SEQ ID NO: 7) linker peptide is shown in italics. SEQ ID NO: 1.

FIG. 10B provides the amino acid sequence for a fusion protein including the 33 N-terminal amino acids of Tomm20 (underlined) fused to the 497 C-terminal amino acids of invasin protein frim *Yersinia pseudotuberculosis* (bolded). The GDPPVAT (SEQ ID NO: 7) linker peptide is shown in italics. SEQ ID NO: 2.

DEFINITIONS

The terms "polynucleotide" and "nucleic acid," used interchangeably herein, refer to a polymeric form of nucleotides of any length, either ribonucleotides or deoxyribonucleotides. Thus, terms "polynucleotide" and "nucleic acid" encompass single-stranded DNA; double-stranded DNA; multi-stranded DNA; single-stranded RNA; double-stranded RNA; multi-stranded RNA; genomic DNA; cDNA; DNA-RNA hybrids; and a polymer comprising purine and pyrimidine bases or other natural, chemically or biochemically modified, non-natural, or derivatized nucleotide bases.

The terms "peptide," "polypeptide," and "protein" are used interchangeably herein, and refer to a polymeric form of amino acids of any length, which can include coded and non-coded amino acids, chemically or biochemically modified or derivatized amino acids, and polypeptides having modified peptide backbones.

The terms "nucleic acid," used herein, refer to a polymeric form of nucleotides of any length, either ribonucleotides or deoxynucleotides. Thus, this term includes, but is not limited to, single-, double-, or multi-stranded DNA or RNA, genomic DNA, cDNA, DNA-RNA hybrids, or a polymer comprising purine and pyrimidine bases or other natural, chemically or biochemically modified, non-natural, or derivatized nucleotide bases.

The term "naturally-occurring" or "unmodified" or "wild type" as used herein as applied to a nucleic acid, a polypeptide, a cell, a mitochondrion, or an organism, refers to a nucleic acid, polypeptide, cell, a mitochondrion, or organism that is found in nature. For example, a polypeptide or polynucleotide sequence that is present in an organism (including viruses) that can be isolated from a source in nature and which has not been intentionally modified by a human in the laboratory is wild type (and naturally occurring).

As used herein the term "isolated" is meant to describe a polynucleotide, a polypeptide, a mitochondrion, or a cell that is in an environment different from that in which the polynucleotide, the polypeptide, the mitochondrion, or the cell naturally occurs. An isolated genetically modified host cell may be present in a mixed population of genetically modified host cells.

By "construct" or "vector" is meant a recombinant nucleic acid, generally recombinant DNA, which has been generated for the purpose of the expression and/or propagation of a nucleotide sequence(s) of interest or is to be used in the construction of other recombinant nucleotide sequences.

As used herein, the term "exogenous mitochondrion" refers to a mitochondrion that is not normally or naturally found in and/or produced by a given bacterium, organism, or cell in nature.

A "donor cell" or a "recipient cell," as used herein, denotes an in vivo, ex vivo, or in vitro eukaryotic cell (e.g., a mammalian cell, such as a human cell), a eukaryotic cell present in a multicellular organism, or a cell of a multicellular organism (e.g., a cell line) cultured as a unicellular entity, which eukaryotic cells can be, or have been, used as recipients for a nucleic acid (e.g., an expression vector that comprises a nucleotide sequence of interest), and include the progeny of the original cell which has been genetically modified by the nucleic acid. It is understood that the progeny of a single cell may not necessarily be completely identical in morphology or in genomic or total DNA complement as the original parent, due to natural, accidental, or deliberate mutation.

A cell or mitochondrion has been "genetically modified" or "transformed" or "transfected" by exogenous DNA, e.g. a recombinant expression vector, when such DNA has been introduced inside the cell or mitochondrion. The presence of the exogenous DNA results in permanent or transient genetic change. The transforming DNA may or may not be integrated (covalently linked) into the genome of the cell or mitochondrion. In mammalian cells and mitochondria for example, the transforming DNA may be maintained on an episomal element such as a plasmid. With respect to eukaryotic cells, a stably transformed cell is one in which the transforming DNA has become integrated into a chromosome so that it is inherited by daughter cells through chromosome replication. This stability is demonstrated by the ability of the eukaryotic cell to establish cell lines or clones that comprise a population of daughter cells containing the transforming DNA. A "clone" is a population of cells derived from a single cell or common ancestor by mitosis. A "cell line" is a clone of a primary cell that is capable of stable growth in vitro for many generations.

As used herein, the term "mitochondrial disease" refers to any disease or disorder caused by or characterized by dysfunctional mitochondria including, but not limited to, diseases that are related to dysfunction in mitochondrial biogenesis and homeostasis. Examples of mitochondrial diseases include, but are not limited to, a mitochondrial myopathy, e.g., Kearns Sayre syndrome (KSS); Myoclonus epilepsy ragged-red fibers (MERRF); Leigh syndrome (subacute sclerosing encephalopathy); Myoneurogenic gastrointestinal encephalopathy (MNGIE); Diabetes mellitus and deafness (DAD); mitochondrial encephalomyopathy, lactic acidosis and stroke-like episodes (MELAS); and mitochondrial neuropathy, e.g., Parkinson's Disease (PD), Neuropathy ataxia retinitis pigmentosa (NARP), Leber hereditary optic neuropathy (LHON), Chronic progressive external ophthalmoplegia (CPEO), and mitochondrial diabetes.

Figure 1:
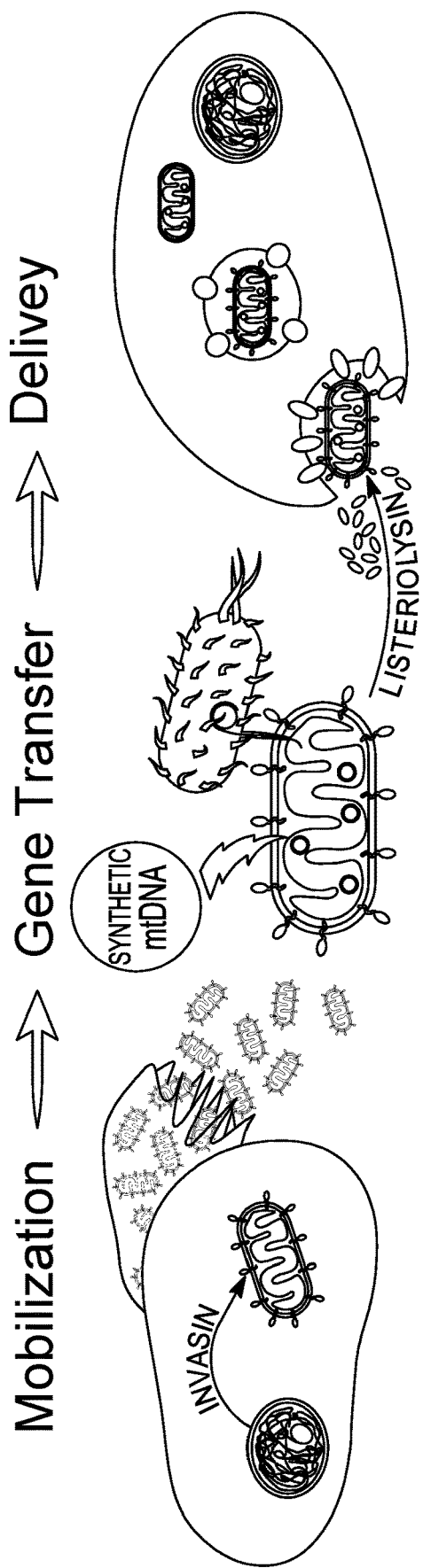
FIG. 1 depicts a schematic image of an exemplary method described herein that includes a step of mobilization, an optional step of gene transfer, and a step of delivery. The method enables the delivery of purified mitochondria to the cytoplasm of cells to effectively transplant mitochondria to cells in situ.
Figure 2:
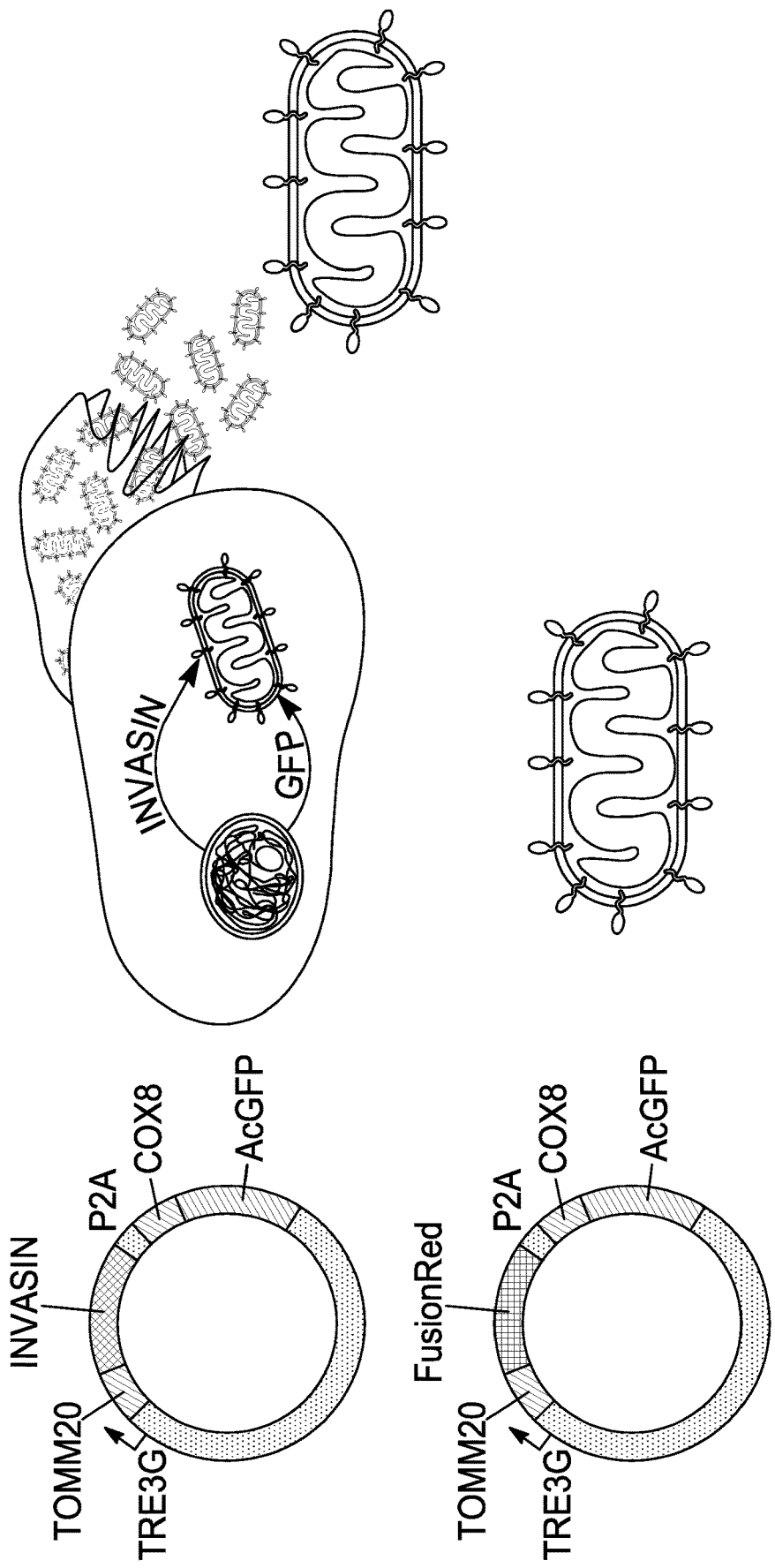
FIG. 2 depicts a schematic image of constructs, which can be used to deliver invasin to the outer membrane and to test for localization of fusion proteins.

The terms "treatment", "treating" and the like are used herein to generally mean obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment" as used herein covers any treatment of a disease in a mammal, and includes: (a) preventing the disease from occurring in a subject which may be predisposed to the disease but has not yet been diagnosed as having it; (b) inhibiting the disease, i.e., arresting its development; or (c) relieving the disease, i.e., causing regression of the disease. The therapeutic agent may be administered before, during or after the onset of disease or injury. The treatment of ongoing disease, where the treatment stabilizes or reduces the undesirable clinical symptoms of the patient, is of particular interest. Such treatment is desirably performed prior to complete loss of function in the affected tissues. The subject therapy will desirably be administered during the symptomatic stage of the disease, and in some cases after the symptomatic stage of the disease.

As used herein, an "effective amount" or "therapeutically effective amount" with respect to an agent (e.g., isolated modified mitochondria, cells including modified mitochondria, or a mitochondrial transport protein inhibitor) refers to the amount of agent that is sufficient to modulate a mitochondrial disease or disorder (e.g., Parkinson's disease) in a subject, for example, to inhibit, suppress, or moderate the deleterious effects of a mitochondrial disease or disorder, e.g. Parkinson's disease, including, but not limited to, shaking, rigidity, resting tremors, bradykinesia, postural stability as well as nonnmtor symptoms such as cognitive impairment, hallucinations, delusion, behavioral abnormalities, depress, disturbance of sleep and wakefulness, loss of smell, pain, constipation, hypotension, urinary frequency, impotence and sweating.

The terms "Individual," "subject," "host," and "patient," are used interchangeably herein and refer to any mammalian subject for whom diagnosis, treatment, or therapy is desired, particularly humans.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a mitochondrion" includes a plurality of such mitochondria and reference to "the nucleic acid" includes reference to one or more nucleic acids and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

The publications discussed herein are provided solely for their disclosure prior to the filing date of the present application. Nothing herein is to be construed as an admission that the present invention is not entitled to antedate such publication. Further, the dates of publication provided may be different from the actual publication dates which may need to be independently confirmed.

DETAILED DESCRIPTION

The present disclosure provides methods and compositions of introducing an exogenous mitochondrion harvested from a donor cell into a recipient cell. Also provided are methods and compositions for producing a modified mitochondrion and treating mitochondrial disease in an individual with the mitochondrial disease. Further provided are modified mitochondria, genetically modified mitochondria, genetically modified cells, isolated compositions and pharmaceutical compositions for practicing the subject methods.

The present disclosure provides compositions including and methods utilizing a modified mitochondrial organelle that can be harvested from a donor cell population and delivered to a recipient cell population. The modifications allow the donor mitochondria to enter to the cytoplasm of the recipient cell, adding to the endogenous mitochondrial pool or replacing faulty or damaged mitochondria. The disclosed methods and compositions can provide healthy donor mitochondria that can restore cellular function in cases where a patient's mitochondria are damaged or depleted by inherited mutations, sporadic mutations, mutations that occur with age, or cellular stress accompanying disease or age. The process also creates an opportunity to modify or add to the DNA contained in mitochondria. Generally, nucleotides do not cross the mitochondrial membrane in a cell, so the mitochondrial genome has been recalcitrant to genome engineering. However, new nucleotides can be delivered to isolated mitochondria by electroporation or conjugation. Thus, an optional component of the present disclosure is the introduction of new DNA or genome editing materials to modify the DNA content of mitochondria between harvesting and delivery. This editing of the mitochondria has uses in synthetic biology and therapeutics, to deliver elements, including peptides to a cell over time that may be regulated by genetic elements encoded in the endogenous or altered mitochondrial DNA.

In some embodiments, mobilization of mitochondrion includes using a fusion protein having a polypeptide capable of binding to an adhesion molecule on the recipient cell and a polypeptide including a mitochondrial outer membrane targeting domain. In some embodiments, the polypeptide capable of binding to the adhesion molecule on the recipient cell includes an extracellular domain of an invasin protein from pathogenic bacteria. In certain embodiments, the invasin protein is derived from *Yersinia pseudotuberculosis*. In some other embodiments, the polypeptide capable of binding to the adhesion molecule on the recipient cell comprises an extracellular domain of an internalin protein. In certain embodiments, the internalin protein is derived from *Listeria monocytogenes*. In some embodiments, the polypeptide including a mitochondrial outer membrane targeting domain is a mitochondrial outer membrane targeting domain of human Translocase of Outer Mitochondrial Membrane 20 (Tomm20). In such embodiments, isolated mitochondrion may bind to adhesion molecules on the recipient cell surface and stimulate endocytosis into a phagosome.

In some embodiments, the methods described herein include contacting the recipient cell with the exogenous mitochondrion from the donor cell. In some embodiments, the methods further include contacting the recipient cell with a pore-forming polypeptide or other suitable endosomal escape agent. In some such embodiments, the pore-forming polypeptide includes a bacterial pH dependent pore, listeriolysin O. When delivered along with the mitochondrion, this channel inserts into the membrane and is also endocytosed. When the phagosome fuses with a lysosome and acidifies, the channel is activated and opens, lysing the phagolysosome and releasing the mitochondrion into the cytoplasm. In some embodiments, exogenous mitochondrion, and their pre-existing or modified mitochondrial DNA, are delivered to the cytoplasm of a recipient cell.

By mitochondria it is meant the organelles that generate energy for the cell by converting the energy of food molecules into the ATP that powers most cell functions. Mitochondrial diseases are often caused by genetic mutations to the mitochondrial DNA that affect mitochondria function. The subclass of these diseases that have neuromuscular disease symptoms are often referred to as mitochondrial myopathies. In further describing aspects of the invention, the following description focuses on Parkinson's disease. However, the subject methods and the reagents, devices and kits thereof also find use in the treatment of other mitochondrial diseases as well, as described above.

METHODS AND COMPOSITIONS

Method of Introducing an Exogenous Mitochondrion and Related Compositions

Provided herein is a method of introducing an exogenous mitochondrion harvested from a donor cell into a recipient cell, the method including: genetically modifying the donor cell to express a fusion protein, the fusion protein including a polypeptide capable of binding to an adhesion molecule on the recipient cell; and a polypeptide including a mitochondrial outer membrane targeting domain; lysing the donor cell; isolating the exogenous mitochondrion from the donor cell; and contacting the recipient cell with the exogenous mitochondrion from the donor cell, wherein the exogenous mitochondrion comprises the fusion protein positioned in the outer membrane of the mitochondrion such that it is capable of binding to the adhesion molecule on the recipient cell; and wherein the exogenous mitochondrion is introduced into the recipient cell. In some embodiments, the method further includes contacting the recipient cell with a pore-forming polypeptide or other suitable endosomal escape agent.

Also provided herein is a method of introducing an exogenous mitochondrion harvested from a donor cell into a recipient cell, the method including contacting the recipient cell with the exogenous mitochondrion from the donor cell, wherein the exogenous mitochondrion includes a fusion protein including a polypeptide capable of binding to an adhesion molecule on the recipient cell; and a polypeptide including a mitochondrial outer membrane targeting domain; wherein the fusion protein is positioned in the outer membrane of the mitochondrion such that it is capable of binding to the adhesion molecule on the recipient cell; and wherein the exogenous mitochondrion is introduced into the recipient cell. In some embodiments, the method further includes contacting the recipient cell with a pore-forming polypeptide or other suitable endosomal escape agent.

In some embodiments, the lysing includes exposing the donor cell to one or more lysis reagents and/or mechanical lysis conditions. Methods which may be used to physically lyse cells, include mechanical disruption, liquid homogenization, high frequency sound waves (sonication), freeze/thaw cycles and manual grinding. In some embodiments, the mechanical lysis conditions can include use of a dounce homogenizer or other suitable device capable of lysing cells. Additional methods of lysing cells in order to obtain intact mitochondria are described, for example, in U.S. Pat. No. 7,407,800, the disclosure of which is incorporated by reference herein.

In some embodiments, the isolating includes differential centrifugation. Various methods may be used to isolate modified mitochondrion from donor cells, e.g., methods that employ homogenization and/or differential centrifugation. See, e.g., (Pallotti et al., Methods Cell Biol 80:3-44, 2007; Schmitt et al., Anal Biochem 443:66-74, doi: 10.1016/j.ab.2013.08.007, 2013; Fernindez-Vizarra et al., Mitochondrion 10:253-262, doi: 10.1016/j.mito.2009.12.148, 2010; Graham et al., Curr Protoc Cell Biol Chapter 3. Unit 3.3, doi: 10.1002/0471143030.cb0303s04, 2001; Frezza et al., Nat Protoc 2:287-295, 2007; Wieckowski et al., Nat Protoc 4:1582-1590, doi: 10.1038/nprot.2009.151, 2009; and Gostimskaya et al., J Vis Exp (43), pii: 2202, doi: 10.3791/2202, 2010. Additional methods are described in U.S. Patent Application Publication No. US20170120237A1, the disclosure of which is incorporated by referenced herein.

Other appropriate cell lysates or fractions may be obtained using routine biochemical methods.

Mitochondria can also be isolated using affinity separation techniques targeting nascent polypeptides or endogenous or tagged mRNA-binding proteins using art-known methods e.g., using the methods of Lynch, 1987, Meth. Enzymol. 152: 248-253, and Brooks and Rigby, 2000. Nucleic Acids Res. 28(10): e49.

In some embodiments, the methods described herein include genetically modifying the exogenous mitochondrion from the donor cell. In such embodiments, the genetically modifying includes introducing an exogenous plasmid into the mitochondrion. In these embodiments, the plasmid includes a polynucleotide encoding an exogenous polypeptide. The polynucleotide may be DNA.

In some cases, molecular recording may be employed to store necessary information in the organism to be collected later. Biological information can be stored chronologically in the DNA through the addition of nucleotides using, for example, CRISPR-Cas9 technology.

Fusion Protein

Provided herein is a fusion protein including a polypeptide capable of binding to an adhesion molecule on a recipient cell; and a polypeptide including a mitochondrial outer membrane targeting domain. Further provided is a nucleic acid encoding the fusion protein described herein. A plasmid including the nucleic acid is also described herein.

In some embodiments, the fusion protein includes a linker peptide positioned between the polypeptide capable of binding to an adhesion molecule on the recipient cell and the polypeptide including a mitochondrial outer membrane targeting domain. In some embodiments, the linker peptide includes the amino acid sequence of GDPPVAT (SEQ ID NO: 7), although other suitable linkers may also be used. In some embodiments, the fusion protein has or includes the amino acid sequence set forth in FIG. 10A. In some other embodiments, the fusion protein has or includes the amino acid sequence set forth in FIG. 10B.

In some cases, the polypeptide capable of binding to an adhesion molecule on a recipient cell includes, but is not limited to, invasin of *Yersinia pseudotuberculosis*, internalin of *Listeria monocytogenes*, SfbI, a fibronectin-binding protein of *Streptococcus pyogenes*, Als3 of *Candida albicans*, and portions thereof.

In some embodiments, the polypeptide including a mitochondrial outer membrane targeting domain is a mitochondrial outer membrane targeting domain of Tomm20, and wherein the mitochondrial outer membrane targeting domain of Tomm20 is less than 145 amino acids in length. In some embodiments, the mitochondrial outer membrane targeting domain of Tomm20 may not be more than 33 amino acids in length. In some embodiments, the mitochondrial outer membrane targeting domain of Tomm20 consists of the 33 N-terminal amino acids of Tomm20.

Other exemplary polypeptides having a mitochondrial outer membrane targeting domain include, but are not limited to, Tomm5, Tomm6, Tomm7, Tomm22. Tomm40 and Tomm70.

Modified Mitochondrion

Provided herein is a modified mitochondrion including a fusion protein including: a polypeptide capable of binding to an adhesion molecule on a recipient cell; and a polypeptide including a mitochondrial outer membrane targeting domain; wherein the modified mitochondrion includes the fusion protein positioned in the outer membrane of the modified mitochondrion such that it is capable of binding to the adhesion molecule on the recipient cell.

Similar to the above, provided herein is an isolated modified mitochondrion including a fusion protein including: a polypeptide capable of binding to an adhesion molecule on a recipient cell; and a polypeptide including a mitochondrial outer membrane targeting domain; wherein the modified mitochondrion includes the fusion protein positioned in the outer membrane of the modified mitochondrion such that it is capable of binding to the adhesion molecule on the recipient cell.

Also provided herein is a genetically modified eukaryotic cell that is not a human cell in vivo, including a modified mitochondrion including a fusion protein including: a polypeptide capable of binding to an adhesion molecule on a recipient cell; and a polypeptide including a mitochondrial outer membrane targeting domain; wherein the modified mitochondrion includes the fusion protein positioned in the outer membrane of the modified mitochondrion such that it is capable of binding to the adhesion molecule on the recipient cell.

In some compositions, the polypeptide capable of binding to the adhesion molecule on the recipient cell includes an extracellular domain of an invasin protein. The invasin protein may be derived from *Yersinia pseudotuberculosis*. In some compositions, the polypeptide capable of binding to the adhesion molecule on the recipient cell includes an extracellular domain of an internalin protein. The internalin protein may be derived from *Listeria monocytogenes*. In some compositions, the polypeptide including a mitochondrial outer membrane targeting domain is a mitochondrial outer membrane targeting domain of human Translocase of Outer Mitochondrial Membrane 20 (Tomm20).

In some embodiments, separate folding and tracking of constructs may be examined to determined optimized mitochondrial outer membrane targeting. In some embodiments, the tracking functionality of the full version of Tomm20 (FIG. 10A) and the truncated version of Tomm20 (FIG. 10B) may be compared. In some embodiments, the expression of bacterial-native invasin and mammalian-optimized invasin may be compared.

Pore-Forming Polypeptide

Any suitable method as described herein may further include contacting the recipient cell with a pore-forming polypeptide, e.g., to facilitate endosomal escape following endocytosis into the host cell. The pore-forming polypeptide may include a polypeptide derived from *Listeria monocytogenes*. In some embodiments, the pore-forming polypeptide is listeriolysin O.

In some embodiments, the pore-forming polypeptides have cytolytic activity. Many natural and synthetic peptides and proteins having cytolytic activity are known. Interactions of pore-forming peptides with the surface of the membrane may be based on nonspecific electrostatic interactions of the positively charged peptide with negatively charged surface of cell membrane. This type of enzymatic activity resulting in the formation of pores in the cell or mitochondrial membrane may be exhibited by, e.g., listeriolysin, equinatoxin, phospholipase PC-PLC and alpha-toxin from *Clostridium perfringens*.

These pore-forming peptides are generally of cationic character, so that they are capable of electrostatic interactions with surfaces with predominantly negatively charged particles. Upon contact and interaction of a pore-forming peptide with lipids on the cell surface, and after penetration inside the cell with the lipids on the surface of the mitochondrial membrane, interruption of the continuity of the cell membrane occurs, followed by formation of small size transmembrane pores, by which leakage of the contents of the cytoplasm, including ions, outside the cell occurs, resulting in rapid and irreversible electrolyte imbalance in the cell, cell lysis and death. The interactions of pore-forming peptides with the surface of the membrane may also include interactions with specific receptors present on the surface.

Known naturally occurring pore-forming peptides of bacterial, plant or mammalian origin capable of forming pores in the cell membrane may be called hemolysines, because they cause lysis of red blood cells and other eukaryotic cells. These toxins include, but are not limited to, cecropin A and B, aurein 1.2, citropin 1.1, defensin (HNP-2), lactoferricin B, tachyplesin, PR-39, cytolysins of *Enterococcus faecalis*, delta hemolysin, diphtheria toxin, cytolysin of *Vibrio cholerae*, toxin from Actinia *equina*, granulysin, lytic peptides from *Streptococcus* internedius, lentiviral lytic peptides, leukotoxin of *Actinobacillus actinomycetemcomitans*, magainin, melittin, lymphotoxin, enkephalin, paradaxin, perforin (in particular the N-terminal fragment thereof), perfringolysin O (PFO/theta toxin) from *Clostridium perfringens*, and streptolysins. Their usefulness as medicaments is limited by their ability to cause hemolysis. Natural cytolytic peptides are described, for example, in R. Smolarczyk et al., Postpy Hig. Med. Dośw., 2009; 63: 360-368

There are also known synthetic pore-forming peptides. They are designed to be devoid of hemolytic properties, to be less immunogenic, or to have surfaces enabling high binding specificity to cellular targets such as for example VEGFR (vascular endothelial growth factor receptor) family receptors and the receptors of the EGFR (epidermal growth factor receptor) family. They are often hybrids of natural cytolytic peptides fragments, such as a hybrid of cecropin A fragment and magainin 2 CA (1-8) MA (1-12) fragment or a hybrid of cecropin A fragment and melittin CAMEL (CA (1-7) MEL (2-9)) fragment. There are also known synthetic cytolytic peptides D-K4-L2-R9 and D-K6-L9, consisting of amino acids lysine, arginine and leucine, part of which is in the form of D-amino acids. There are also known synthetic chimeric peptides RGD-4CD(KLAKLAK)2, which contains the RGD motif binding with integrin αvβ3 and an effector domain composed of D-amino acids KLAKLAKKLAK-LAK, and PTD-5D(KLAKLAK)2 containing PTD-5 motif which allows penetration into the cells and an effector domain composed of D-amino acids KLAKLAKKLAK-LAK (see, for e.g., R. Smolarczyk et al., Postpy Hig. Med. Dośw., 2009, 63: 360-368). Other well-known synthetic pore-forming peptides are described, for example, in Regen et al., Biochem. Biophys. Res. Commun. 159: 566-571, 1989.

Endosomal Escape Agents

Endosomal escape agents which may be utilized for delivery of exogenous and/or modified mitochondria to a recipient cell include, but are not limited to, haemagglutinin (HA2), (HA2)/poly (L-lysine) (PLL), diINF-7, penton base, gp41, gp41/polyethylenimine (PEI), TAT, L2 from Papillomavirus, envelope protein (E) of West Nile virus, listeriolysin O (LLO), Pneumococcal pneumolysin (PLO), Streptococcal streptolysin O (SLO), Diphtheria toxin (DT), *Pseudomonas aeruginosa* exotoxin A, (ETA), Shiga toxin, cholera toxin, Ricin, Saporin, Gelonin, human calcitonin derived peptide, hCT, fibroblast growth factors receptor (FGFR3), Melittin, (R-Ahx-R)(4) AhxB, glycoprotein H (gpH) from herpes simplex, KALA, GALA, Synthetic surfactants, Penetratin (pAntp), R6-Penetratin with arginine-residues, EB1, bovine prion protein (bPrPp), Poly (L-histidine), Sweet Arrow Peptide (SAP), polyethylenimine (PEI), Poly(amidoamine)s (PAAs), poly(propylacrylic acid) (PPAA), ammonium chloride, chloroquine, and methylamine. See, e.g., Varkouhi et al. *Journal of Controlled Release*, 151 (2011) 220-228.

Method of Producing a Modified Mitochondrion

Provided herein is a method of producing a modified mitochondrion, the method including genetically modifying a donor cell to express a fusion protein (as described herein), the fusion protein including: a polypeptide capable of binding to an adhesion molecule on a recipient cell; and a polypeptide including a mitochondrial outer membrane targeting domain; wherein the modified mitochondrion is produced and wherein the modified mitochondrion includes the fusion protein positioned in the outer membrane of the modified mitochondrion such that it is capable of binding to the adhesion molecule on the recipient cell.

In some cases, the method of producing a modified mitochondrion further includes lysing the donor cell. In some cases, the method of producing a modified mitochondrion further includes isolating the modified mitochondrion from the donor cell. In some cases, the method of producing a modified mitochondrion further includes contacting the recipient cell with the modified mitochondrion from the donor cell. In some cases, the method of producing a modified mitochondrion further includes contacting the recipient cell with a pore-forming polypeptide. In some cases, the method of producing a modified mitochondrion further includes genetically modifying the modified mitochondrion from the donor cell.

In some embodiments, making modified mitochondrion from a donor cell includes a step of delivering an element to the outer membrane of the mitochondria that allows the mtDonors to be endocytosed into recipient cells. Such an element may be delivered using an mtDonor host cell. In some exemplary embodiments, a plasmid may be delivered to the host cell that encodes a fusion protein including an N-terminus of Tomm20 to allow for localization to the outer membrane and the extracellular region of invasin including its integrin-binding domain to allow for uptake by recipient cells (FIG. 1).

Generally, an invasin protein enables non-invasive microorganisms to bind to and be endocytosed by non-phagocytic mammalian cells. By engineering mitochondria to express invasin protein on their outer membrane, mitochondria capable of entering cells may be produced.

In some embodiments, to create a new hybrid cell line with modified mitochondrion, add a new mitochondrial genome or additional plasmids, cells of their native mitochondrion are depleted to generate a null background. Methods of isolating human cell lines lacking mitochondrial DNA are known in the art, such as in King et al., Methods Enzymol. 264:304-13 (1996). In such embodiments, these cells may be depleted using ethidium bromide mitochondrial DNA intercalation or EcoRI cleavage of mtDNA. Such ethidium bromide (EtBr) treatment may be measured by measuring the change in quantity of mitochondrial DNA markers COX2 and NAD12, when normalized against a negative control.

In some embodiments, the polypeptide capable of binding to an adhesion molecule on a recipient cell may be delivered to isolated mitochondrion using protein engineering of cell surfaces. This technology exploits the fact that proteins that are anchored by glycoinositol phospholipids (GPIs), when purified and added to cells in vitro, incorporate into their surface membranes and are fully functional, such as that described in Medof et al., FASEB J. 10(5):574-86. (1996). By substituting 3'-mRNA end sequence of naturally GPI-anchored proteins (i.e., a sequence that contains the signals that direct GPI anchoring) for endogenous 3'-mRNA end sequence, virtually any protein of interest can be expressed as a GPI-anchored derivative. The GPI-anchored product then can be purified from transfectants and the purified protein used to "paint" any target cell. Such protein engineering or "painting" of the cell surface enables GPI-anchored proteins to be painted onto cells that are difficult to transfect. Cells may also be altered immediately without previous culturing. The amount of protein added to the surface can be precisely controlled, and multiple GPI-anchored proteins can be sequentially or concurrently inserted into the same cells. See, e.g., FIG. 5.

Method of Producing a Genetically Modified Mitochondrion

Provided herein is a method of producing a genetically modified mitochondrion, the method including genetically modifying a mitochondrion, wherein the mitochondrion includes a fusion protein, the fusion protein including: a polypeptide capable of binding to an adhesion molecule on a recipient cell; and a polypeptide including a mitochondrial outer membrane targeting domain; wherein the mitochondrion includes the fusion protein positioned in the outer membrane of the mitochondrion such that it is capable of binding to the adhesion molecule on the recipient cell. In some embodiments, the genetically modifying includes introducing an exogenous plasmid into the mitochondrion. In such embodiments, the plasmid may include a polynucleotide encoding an exogenous polypeptide. In some such embodiments, the polynucleotide is DNA.

In some aspects, the method of producing a genetically modified mitochondrion further includes contacting the recipient cell with the mitochondrion. In some cases, the producing a genetically modified mitochondrion further includes contacting the recipient cell with a pore-forming polypeptide. In some exemplary cases, to deliver the recording device or other DNA of interest into mitochondria, electroporation of the mitochondria to open holes in the outer membrane may be used, e.g., to allow plasmids to enter the mitochondria.

Suitable methods of genetic modification (also referred to as "transformation") include e.g., viral or bacteriophage infection, transfection, conjugation, protoplast fusion, lipofection, electroporation, calcium phosphate precipitation, polyethyleneimine (PEI)-mediated transfection, DEAE-dextran mediated transfection, liposome-mediated transfection, particle gun technology, calcium phosphate precipitation, direct micro injection, nanoparticle-mediated nucleic acid delivery (see, e.g., Panyam et. al, Adv Drug Deliv Rev. 2012 Sep. 13. pii: S0169-409X(12)00283-9. doi: 10.1016/j.addr.2012.09.023), and the like. A suitable method of delivering a nucleic acid is via ribonucleoprotein (RNP)-mediated genetic modification.

The choice of method of genetic modification is generally dependent on the type of cell being transformed and the circumstances under which the transformation is taking place (e.g., in vitro, ex vivo, or in vivo). A general discussion of these methods can be found in Ausubel, et al., Short Protocols in Molecular Biology, 3rd ed., Wiley & Sons, 1995.

In some cases, exogenous proteins or nucleic acids such as mRNA or plasmid DNA can be introduced into harvested/isolated mitochondria (e.g., isolated from a donor cell) prior to transplantation into a recipient/host/target cell. For example, exogenous materials such as nucleic acids can be introduced by electroporation or conjugation (see, e.g., Yoon et al., Nucleic Acids Res. 2003 Mar. 1; 31(5):1407-15; Collombet et al., J Biol Chem. 1997 Feb. 21; 272(8):5342-7). As an illustrative example, in some cases a desirable balance between nucleic acid internalization and maintenance of mitochondrial functional integrity can be achieved via electroporation using a field strength of about 12 kV/cm. As would be known to one of ordinary skill in the art, mitochondrial functional integrity can be verified by enzymatic assays of specific mitochondrial marker enzymes and by measuring respiratory control (see, e.g., Collombet et al., *J Biol Chem.* 1997 Feb. 21; 272(8):5342-7).

By altering, supplementing, or replacing mitochondrial DNA before delivering the mitochondria to a recipient cell, the donor mitochondria could add function to the recipient cell. For instance, mitochondria produce proteins internally, and in some cases a protein produced in the mitochondria can be delivered to the cytoplasm of the recipient cell. Editing of the mitochondria prior to transplantation has uses in synthetic biology or therapeutics. For example, elements such as peptides, can be delivered to a cell over time that may be regulated by genetic elements encoded in the endogenous or altered mitochondrial DNA.

Exogenous nucleic acids that are introduced into the isolated mitochondria can encode any desirable protein that will be expressed by the mitochondria. In some cases, introduced exogenous nucleic acids encode gene editing reagents for the purpose of altering/editing mitochondrial DNA. In other words, in some cases gene editing tools/reagents are introduced into the harvested/isolated mitochondria. Thus, in some cases, the DNA of isolated/donor mitochondria is altered prior to transplantation. In some such cases, a donor template (donor DNA) is introduced to provide a nucleotide sequence that will be inserted into the mitochondrial DNA after a gene editing nuclease (e.g., CRISPR effector protein, ZFN, TALEN) cleaves the targeted mitochondrial DNA. For example, a DNA donor templated can be introduced along with one or more nucleic acids (e.g., one or more plasmids) that encode a gene editing protein such as a zinc finger protein (ZFP) (e.g., a zinc finger nuclease—ZFN), a transcription activator-like effector (TALE) protein (e.g., fused to a nuclease—TALEN), or a CRISPR/Cas effector polypeptide (e.g., Cas9, CasX, CasY, Cpf1, and the like).

In class 2 CRISPR systems, the functions of the effector complex (e.g., the cleavage of target DNA) are carried out by a single endonuclease (e.g., see Zetsche et al, Cell. 2015 Oct. 22; 163(3):759-71; Makarova et al, Nat Rev Microbiol. 2015 November; 13(11):722-36; and Shmakov et al., Mol Cell. 2015 Nov. 5:60(3):385-97). As such, the term "CRISPR/Cas effector polypeptide" is used herein to encompass the endonuclease (the target nucleic acid cleaving protein) from class 2 CRISPR systems. Thus, the term "CRISPR/Cas effector polypeptide" as used herein encompasses type I1 CRISPR/Cas proteins (e.g., Cas9), type V CRISPR/Cas proteins (e.g., Cpf1, C2c1, C2C3), and type VI CRISPR/Cas proteins (e.g., C2c2). To date, class 2 CRISPR/Cas proteins encompass type II, type V, and type VI CRISPR/Cas proteins, but the term is also meant to encompass any class 2 CRISPR/Cas protein suitable for binding to a corresponding guide RNA and forming an ribonucleoprotein (RNP) complex.

In some cases, a gene editing reagent delivered harvested/isolated mitochondria can include one or more of: (i) a CRISPR/Cas guide RNA, (ii) a DNA encoding a CRISPR/Cas guide RNA, (iii) a DNA and/or RNA encoding a programmable gene editing protein such as a zinc finger protein (ZFP) (e.g., a zinc finger nuclease—ZFN), a transcription activator-like effector (TALE) protein (e.g., fused to a nuclease—TALEN), a CRISPR/Cas effector polypeptide (e.g., Cas9, CasX, CasY, Cpf1, C2c1, C2C3 C2C2, and the like); (iv) a donor DNA; (v) a nucleic acid molecule (DNA, RNA) encoding a site-specific recombinase (e.g., Cre recombinase, Dre recombinase, Flp recombinase, KD recombinase, B2 recombinase, B3 recombinase, R recombinase, Hin recombinase. Tre recombinase, PhiC31 integrase, Bxb1 integrase, R4 integrase, lambda integrase, HK022 integrase, HPI integrase, and the like); (vi) a DNA encoding a resolvase and/or invertase (e.g., Gin, Hin, γδ3, Tn3, Sin, Beta, and the like); and (vii) a transposon and/or a DNA derived from a transposon (e.g., bacterial transposons such as Tn3, Tn5, Tn7, Tn9, Tn10, Tn903, Tn1681, and the like).

For additional information related to programmable gene editing tools (e.g., CRISPR/Cas R-NA-guided proteins such as Cas9, CasX, CasY, Cpf1, C2c1, C2C3, and C2C2, Zinc finger proteins such as Zinc finger nucleases, TALE proteins such as TALENs, CRISPR/Cas guide RNAs, and the like) refer to, for example, Dreier, et al., (2001) J Biol Chem 276:29466-78; Dreier, et al., (2000) J Mol Biol 303:489-502; Liu, et al., (2002) J Biol Chem 277:3850-6); Dreier, et al., (2005) J Biol Chem 280:35588-97; Jamieson, et al., (2003) Nature Rev Drug Discov 2:361-8; Durai, et al., (2005) Nucleic Acids Res 33:5978-90; Segal, (2002) Methods 26:76-83; Porteus and Carroll, (2005) Nat Biotechnol 23:967-73; Pabo, et al., (2001) Ann Rev Biochem 70:313-40; Wolfe, et al., (2000) Ann Rev Biophys Biomol Struct 29:183-212; Segal and Barbas, (2001) Curr Opin Biotechnol 12:632-7; Segal, et al., (2003) Biochemistry 42:213748; Beerli and Barbas, (2002) Nat Biotechnol 20:13541; Carroll, et al., (2006) Nature Protocols 1:1329; Ordiz, et al., (2002) Proc Natl Acad Sci USA 99:13290-5; Guan, et al., (2002) Proc Natd Acad Sci USA 99:13296-301; Sanjana et al., Nature Protocols, 7:171-192 (2012); Zetsche et al. Cell. 2015 Oct. 22; 163(3):759-71; Makarova et al, Nat Rev Microbiol. 2015 November; 13(11):722-36; Shmakov et al., Mol Cell. 2015 Nov. 5; 60(3):385-97; Jinek et al., Science. 2012 Aug. 17:337(6096):816-21; Chylinski et al., RNA Biol. 2013 May; 10(5):726-37; Ma et al., Biomed Res Int. 2013; 2013:270805; Hou et al., Proc Nati Acad Sci USA. 2013 Sep. 24; 110(39):15644-9; Jinek et al., Elife. 2013; 2:e00471; Pattanayak et al., Nat Biotechnol. 2013 September; 31(9):839-43; Qi et al, Cell. 2013 Feb. 28; 152(5):1173-83; Wang et al., Cell. 2013 May 9; 153(4):910-8; Auer et. al., Genome Res. 2013 Oct. 31; Chen et. al., Nucleic Acids Res. 2013 Nov. 1; 41(20):e19; Cheng et. al., Cell Res. 2013 October; 23(10):1163-71; Cho et. al., Genetics. 2013 November; 195(3):1177-80; DiCarlo et al., Nucleic Acids Res. 2013 April; 41(7):4336-43; Dickinson et. al., Nat Methods. 2013 October; 10(10):1028-34; Ebina et. al., Sci Rep. 2013; 3:2510; Fujii et. al, Nucleic Acids Res. 2013 Nov. 1; 41(20):e187; Hu et. al., Cell Res. 2013 November; 23(11):1322-5; Jiang et. al., Nucleic Acids Res. 2013 Nov. 1; 41(20):e188; Larson et. al., Nat Protoc. 2013 November; 8(11):2180-96; *Mali* et. at., Nat Methods. 2013 October; 10(00):957-63; Nakayama et. al., Genesis. 2013 December; 51(12):835-43; Ran et. al., Nat Protoc. 2013 November; 8(11):2281-308; Ran et. al., Cell. 2013 Sep. 12; 154(6): 1380-9; Upadhyay et. al., G3 (Bethesda). 2013 Dec. 9; 3(12):2233-8; Walsh et. al., Proc Natl Acad Sci USA. 2013 Sep. 24; 110(39):15514-5; Xie et. al., Mol Plant. 2013 Oct. 9; Yang et. al., Cell. 2013 Sep. 12; 154(6):1370-9; Briner et al., Mol Cell. 2014 Oct. 23; 56(2):333-9; Burstein et al., Nature. 2016 Dec. 22-Epub ahead of print; Gao et al., Nat Biotechnol. 2016 July 34(7):768-73; as well as international patent application publication Nos. WO2002099084; WO00/42219; WO02/42459; WO2003062455; WO03/080809; WO05/014791; WO05/084190; WO08/021207; WO09/042186; WO09/054985; and WO10/065123; U.S. patent application publication Nos. 20030059767, 20030108880, 20140068797; 20140170753; 20140179006; 20140179770; 20140186843; 20140186919; 20140186958; 20140189896; 20140227787; 20140234972; 20140242664; 20140242699; 20140242700; 20140242702; 20140248702; 20140256046; 20140273037; 20140273226; 20140273230; 20140273231; 20140273232; 20140273233; 20140273234; 20140273235; 20140287938; 20140295556; 20140295557; 20140298547; 20140304853; 20140309487; 20140310828; 20140310830; 20140315985; 20140335063; 20140335620; 20140342456; 20140342457; 20140342458; 20140349400; 20140349405; 20140356867; 20140356956; 20140356958; 20140356959; 20140357523; 20140357530; 20140364333; 20140377868; 20150166983; and 20160208243; and U.S. Pat. Nos. 6,140,466; 6,511,808; 6,453,242 8,685,737; 8,906, 616; 8,895,308; 8,889,418; 8,889,356; 8,871,445; 8,865, 406; 8,795,965; 8,771,945; and 8,697,359; all of which are hereby incorporated by reference in their entirety Pharmaceutical Compositions In some aspects, provided herein is a pharmaceutical composition including the modified mitochondrion described herein, and a pharmaceutically acceptable carrier. In some other aspects, the pharmaceutical composition further includes a pore-forming polypeptide.

The term "pharmaceutically acceptable" means approved by a regulatory agency of the Federal or a state government or listed in the U.S. Pharmacopeia or other generally recognized foreign pharmacopeia for use in animals, and more particularly in humans. The term "carrier" refers to a diluent, adjuvant, excipient, or vehicle with which the modified mitochondrion is administered. Such pharmaceutical carriers can be, for example, sterile liquids, such as saline solutions in water and oils, including those of petroleum, animal, vegetable or synthetic origin, such as peanut oil, soybean oil, mineral oil, sesame oil and the like. A saline solution is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations and the like. The composition can be formulated as a suppository, with traditional binders and carriers such as triglycerides. Examples of suitable pharmaceutical carriers are described in "Remington's Pharmaceutical Sciences" by E. W. Martin, hereby incorporated by reference herein in its entirety. Such compositions will contain a therapeutically effective amount of the modified mitochondrion, preferably in purified form, together with a suitable amount of carrier so as to provide the form for proper administration to the patient. The formulation should suit the mode of administration.

The pharmaceutical composition can also include any of a variety of stabilizing agents, such as an antioxidant for example. When the pharmaceutical composition includes a polypeptide, the polypeptide can be complexed with various well-known compounds that enhance the in vivo stability of the polypeptide, or otherwise enhance its pharmacological properties (e.g., increase the half-life of the polypeptide, reduce its toxicity, enhance solubility or uptake). Examples of such modifications or complexing agents include sulfate, gluconate, citrate and phosphate. The polypeptides of a composition can also be complexed with molecules that enhance their in vivo attributes. Such molecules include, for example, carbohydrates, polyamines, amino acids, other peptides, ions (e.g., sodium, potassium, calcium, magnesium, manganese), and lipids.

Further guidance regarding formulations that are suitable for various types of administration can be found in Remington's Pharmaceutical Sciences, Mace Publishing Company, Philadelphia, Pa., 17th ed. (1985). For a brief review of methods for drug delivery, see, Langer, Science 249: 1527-1533 (1990).

The components used to formulate the pharmaceutical compositions are preferably of high purity and are substantially free of potentially harmful contaminants (e.g., at least National Food (NF) grade, generally at least analytical grade, and more typically at least pharmaceutical grade). Moreover, compositions intended for in vivo use are usually sterile. To the extent that a given compound must be synthesized prior to use, the resulting product is typically substantially free of any potentially toxic agents, particularly any endotoxins, which may be present during the synthesis or purification process. Compositions for parental administration are also sterile, substantially isotonic and made under GMP conditions.

The pharmaceutical composition can be formulated for intravenous, oral, via implant, transmucosal, transdermal, intramuscular, intrathecal, or subcutaneous administration. In some embodiments, the pharmaceutical composition is formulated for intravenous administration. In other embodiments, the pharmaceutical composition is formulated for subcutaneous administration. In suitable embodiments, the pharmaceutical composition. e.g., a composition comprising modified mitochondrion as described herein, may be administered via local delivery to tissues including, heart, liver, or brain. Such delivery could be percutaneous or via delivery through a surgical procedure to gain access to the site of delivery. The following delivery systems, which employ a number of routinely used pharmaceutical carriers, are only representative of the many embodiments envisioned for administering the instant compositions.

Injectable drug delivery systems include solutions, suspensions, gels, microspheres and polymeric injectables, and can comprise excipients such as solubility-altering agents (e.g., ethanol, propylene glycol and sucrose) and polymers (e.g., polycaprylactones and PLGAs). Implantable systems include rods and discs and can contain excipients such as PLGA and polycaprylactone. Osteopontin or nucleic acids of the invention can also be administered attached to particles using a gene gun.

Oral delivery systems include tablets and capsules. These can contain excipients such as binders (e.g., hydroxypropylmethylcellulose, polyvinyl pyrilodone, other cellulosic materials and starch), diluents (e.g., lactose and other sugars, starch, dicalcium phosphate and cellulosic materials), disintegrating agents (e.g., starch polymers and cellulosic materials) and lubricating agents (e.g., stearates and talc).

Transmucosal delivery systems include patches, tablets, suppositories, pessaries, gels and creams, and can contain excipients such as solubilizers and enhancers (e.g., propylene glycol, bile salts and amino acids), and other vehicles (e.g., polyethylene glycol, fatty acid esters and derivatives, and hydrophilic polymers such as hydroxypropylmethylcellulose and hyaluronic acid).

Dermal delivery systems include, for example, aqueous and nonaqueous gels, creams, multiple emulsions, microemulsions, liposomes, ointments, aqueous and nonaqueous solutions, lotions, aerosols, hydrocarbon bases and powders, and can contain excipients such as solubilizers, permeation enhancers (e.g., fatty acids, fatty acid esters, fatty alcohols and amino acids), and hydrophilic polymers (e.g., polycarbophil and polyvinylpyrolidone). In one embodiment, the pharmaceutically acceptable carrier is a liposome or a transdermal enhancer.

In certain embodiments, the pharmaceutical composition including the modified mitochondrion is formulated to cross the blood brain barrier (BBB). One strategy for drug delivery through the blood brain barrier (BBB) entails disruption of the BBB, either by osmotic means such as mannitol or leukotrienes, or biochemically by the use of vasoactive substances such as bradykinin. A BBB disrupting agent can be co-administered with the therapeutic compositions when the compositions are administered by intravascular injection. Other strategies to go through the BBB may entail the use of endogenous transport systems, including caveoil-1 mediated transcytosis, carrier-mediated transporters such as glucose and amino acid carriers, receptor-mediated transcytosis for insulin or transferrin, and active efflux transporters such as p-glycoprotein. Active transport moieties may also be conjugated to the therapeutic compounds for use in the invention to facilitate transport across the endothelial wall of the blood vessel. Alternatively, drug delivery of the ND pharmaceutical composition behind the BBB may be by local delivery, for example by intrathecal delivery, e.g., through an Ommaya reservoir (see, e.g., U.S. Pat. Nos. 5,222,982 and 5,385,582, incorporated herein by reference); by bolus injection, e.g., by a syringe, e.g., intravitreally or intracranially; by continuous infusion, e.g., by cannulation, e.g., with convection (see, e.g., US Application No. 20070254842, incorporated here by reference); or by implanting a device upon which the modified mitochondrion pharmaceutical composition has been reversibly affixed (see e.g., US Application Nos. 20080081064 and 20090196903, incorporated herein by reference).

Components of the pharmaceutical composition can be supplied either separately or mixed together in unit dosage form, for example, as a dry lyophilized powder or water free concentrate. Where the composition is to be administered by infusion, it can be dispensed with an infusion bottle containing sterile pharmaceutical grade water or saline. Where the composition is administered by injection, an ample of sterile water for injection or saline can be provided so that the ingredients may be mixed prior to administration.

In some embodiments, one or more components of the pharmaceutical composition is supplied as a dry sterilized lyophilized powder, e.g., that is capable of being reconstituted to the appropriate concentration for administration to a subject. For example, GPI-anchored invasin and listeriolysin O could each be lyophilized and reconstituted and then combined with mitochondria to create the therapeutic composition. In some embodiments, the pharmaceutical composition is supplied as a water free concentrate.

Solutions, suspensions and powders for reconstitutable delivery systems include vehicles such as suspending agents (e.g., gums, xanthans, cellulosics and sugars), humectants (e.g., sorbitol), solubilizers (e.g., ethanol, water, PEG and propylene glycol), surfactants (e.g., sodium lauryl sulfate, Spans, Tweens, and cetyl pyridine), preservatives and antioxidants (e.g., parabens, vitamins E and C, and ascorbic acid), anti-caking agents, coating agents, and chelating agents (e.g., EDTA).

Methods of Treatment

Provided herein is a method of treating a mitochondrial disease or disorder in a subject having a mitochondrial disease or disorder, including administering a therapeutically effective amount of the modified mitochondrion described herein or a cell including the modified mitochondrion described herein, to the subject. In some embodiments, the method includes administering a pore-forming polypeptide or other suitable endosomal escape agent to the subject. In such embodiments, the pore-forming polypeptide may include a polypeptide derived from *Listeria monocytogenes*. In some embodiments, the pore-forming polypeptide is listeriolysin O. In some embodiments, the administering includes administering a cell including the modified mitochondrion to the subject. The cell may be derived from the subject, e.g., as part of an autologous cell treatment. In some embodiments, the subject is a human.

In certain aspects, the mitochondrial disease includes Leigh syndrome; Neuropathy, ataxia, and retinitis pigmentosa (NARP); Leber's hereditary optic neuropathy (LHON); Chronic progressive external ophthalmoplegia (CPEO); or mitochondrial diabetes.

By an "effective amount" or a "therapeutically effective amount" of the modified mitochondrion it is meant an amount that is required to reduce the severity, the duration and/or the symptoms of the mitochondrial disease. For example, in some embodiments of the subject methods, an effective mount of the modified mitochondrion is administered for the treatment of Leigh syndrome; Neuropathy, ataxia, and retinitis pigmentosa (NARP); Leber's hereditary optic neuropathy (LHON); Chronic progressive external ophthalmoplegia (CPEO); or mitochondrial diabetes. In some embodiments, an effective mount of the modified mitochondrion is administered for the treatment of Parkinson's Disease (PD). Symptoms of Parkinson's disease include but are not limited to motor symptoms such as shaking, rigidity, resting tremors, bradykinesia, postural stability as well as nonmotor symptoms such as cognitive impairment, hallucinations, delusion, behavioral abnormalities, depression, disturbance of sleep and wakefulness, loss of smell, pain, constipation, hypotension, urinary frequency, impotence and sweating. In some instances, the method further includes the step of measuring one or more of the aforementioned motor and/or nonmotor symptoms of PD, e.g. before and/or after treatment with the modified mitochondrion and determining that the one or more symptoms have been reduced.

The calculation of the effective amount or effective dose of the modified mitochondrion, cell, or pharmaceutical composition to be administered is within the skill of one of ordinary skill in the art and will be routine to those persons skilled in the art by using assays known in the art, e.g. as described herein. The effective amount of a modified mitochondrion or pharmaceutical composition to be given to a particular patient will depend on a variety of factors, several of which will differ from patient to patient. A competent clinician will be able to determine an effective amount of a therapeutic agent to administer to a patient to halt or reverse the progression the disease condition as required. For example, the effective amount may be dependent upon the route of administration, the seriousness of Parkinson's disease, and should be decided according to the judgment of the practitioner and each human patient's circumstances.

Determining a therapeutically effective amount of the modified mitochondrion or cell containing same can be done based on animal data using routine computational methods. For example, effective amounts may be extrapolated from dose-response curves derived from preclinical protocols either in vitro (e.g., dopaminergic neuron cultures, such as the ones described below, treated with rotenone or MPP+ for 24 h, or with Epoxymicin for 48 h) or using any of the in vivo Parkinson's disease animal models known in the art (e.g., 6-hydroxydopamine (6-OHDA) rat model, MPTP mouse or primate model or rotenone model). See Duty et al., *Br J Pharmacol.* 164(4): 1357-1391 (2011), incorporated herein by reference. Utilizing LD50 animal data, and other information available for the agent, a clinician can determine the maximum safe dose for an individual, depending on the route of administration. For instance, an intravenously administered dose may be more than an intrathecally administered dose, given the greater body of fluid into which the therapeutic composition is being administered. Similarly, compositions which are rapidly cleared from the body may be administered at higher doses, or in repeated doses, in order to maintain a therapeutic concentration. Utilizing ordinary skill, the competent clinician will be able to optimize the dosage of a particular therapeutic in the course of routine clinical trials.

In some embodiments, the effective amount of the pharmaceutical composition provided herein is between about 0.001 mg/kg and about 1000 mg/kg body weight of a human subject. In certain embodiments, the pharmaceutical composition is administered to a human subject in an amount of about 1000 mg/kg body weight or less, about 950 mg/kg body weight or less, about 900 mg/kg body weight or less, about 850 mg/kg body weight or less, about 800 mg/kg body weight or less, about 750 mg/kg body weight or less, about 700 mg/kg body weight or less, about 650 mg/kg body weight or less, about 600 mg/kg body weight or less, about 550 mg/kg body weight or less, about 500 mg/kg body weight or less, about 450 mg/kg body weight or less, about 400 mg/kg body weight or less, about 350 mg/kg body weight or less, about 300 mg/kg body weight or less, about 250 mg/kg body weight or less, about 200 mg/kg body weight or less, about 150 mg/kg body weight or less, about 100 mg/kg body weight or less, about 95 mg/kg body weight or less, about 90 mg/kg body weight or less, about 85 mg/kg body weight or less, about 80 mg/kg body weight or less, about 75 mg/kg body weight or less, about 70 mg/kg body weight or less, or about 65 mg/kg body weight or less.

In some embodiments, the effective amount of the pharmaceutical composition provided herein is between about 0.001 mg/kg and about 60 mg/kg body weight of a human subject. In some embodiments, the effective amount of a pharmaceutical composition provided herein is about 0.001 mg/kg, about 0.05 mg/kg, about 0.10 mg/kg, about 0.20 mg/kg, about 0.40 mg/kg, about 0.80 mg/kg, about 1.0 mg/kg, about 1.5 mg/kg, about 3 mg/kg, about 5 mg/kg, about 10 mg/kg, about 15 mg/kg, about 20 mg/kg, about 25 mg/kg, about 30 mg/kg, about 35 mg/kg, about 40 mg/kg, about 45 mg/kg, about 50 mg/kg or about 60 mg/kg. Lower concentration ranges may be particularly suitable in the context of local delivery to tissue.

The modified mitochondria can be administered for prophylactic and/or therapeutic treatments. Toxicity and therapeutic efficacy of the active ingredient can be determined according to standard pharmaceutical procedures in cell cultures and/or experimental animals, including, for example, determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Compounds that exhibit large therapeutic indices are preferred.

The data obtained from cell culture and/or animal studies can be used in formulating a range of dosages for humans. The dosage of the active ingredient typically lines within a range of circulating concentrations that include the ED50 with low toxicity. The dosage can vary within this range depending upon the dosage form employed and the route of administration utilized. The modified mitochondrion be administered daily, semi-weekly, weekly, semi-monthly, monthly, etc., at a dose of from about 0.001 mg, from about 0.1 mg, from about 1 mg, from about 5 mg, from about 10 mg, from about 100 mg or more per kilogram of body weight when administered systemically. Smaller doses may be utilized in localized administration, e.g., in direct administration to ocular nerves, etc.

Cells in vivo may be contacted with one or modified mitochondria suitable for pharmaceutical use, by any of a number of well-known methods in the art for the administration of the modified mitochondria provided herein to a subject. The modified mitochondrion can be incorporated into a variety of formulations, including but not limited to, solid, semi-solid, liquid or gaseous forms, such as tablets, capsules, powders, granules, ointments, solutions, suppositories, injections, inhalants, gels, microspheres, and aerosols. As such, administration of the modified mitochondrion can be achieved in various ways, including oral, buccal, rectal, parenteral, intraperitoneal, intradermal, transdermal, intratracheal, etc., administration. The pharmaceutical composition including the modified mitochondrion may be systemic after administration or may be localized by the use of regional administration, intramural administration, or use of an implant that acts to retain the active dose at the site of implantation. The pharmaceutical composition including the modified mitochondrion may be formulated for immediate activity or they may be formulated for sustained release.

Mammalian species that may be treated with the present methods include canines and felines; equines; bovines; ovines; etc. and primates, particularly humans. In some embodiments, the method is for the treatment of a human. Animal models, particularly small mammals, e.g., murine, lagomorpha, etc. may be used for experimental investigations.

In some embodiments, the method further includes measuring one or more symptoms of the individual to confirm that an effective amount of a modified mitochondrion or cell containing same has been administered. In some embodiments, the one or more symptom includes shaking, rigidity, resting tremors, bradykinesia, postural stability as well as nonmotor symptoms such as cognitive impairment, hallucinations, delusion, behavioral abnormalities, depress, disturbance of sleep and wakefulness, loss of smell, pain, constipation, hypotension, urinary frequency, impotence or sweating. In In certain embodiments, the modified mitochondrion, cell containing same, or pharmaceutical composition is administered in combination with a second therapeutic agent for the treatment of the mitochondrial disease known in the art. For example, if the mitochondrial disease is Leigh syndrome the subject methods may comprise administration of a second therapeutic agent known in the art to treat Leigh syndrome, e.g., thiamine, Vitamin B1, oral sodium bicarbonate or sodium citrate, or dichloroacetate. If the mitochondrial disease is Parkinson's disease the subject methods may comprise administration of a second therapeutic agent known in the art to treat Parkinson's disease, e.g., levodopa (alone or in combination with a dopa decarboxylase inhibitor or COMT inhibitor), dopamine agonists (e.g., bromocriptine, pergolide, pramipexole, ropinirole, piribedil, cabergoline, apomorphine, and lisuride), MAO-B inhibitors (e.g., selegiline and rasagiline), amantadine, and anticholinergics.

Exemplary Non-Limiting Aspects of the Disclosure

Aspects, including embodiments, of the present subject matter described above may be beneficial alone or in combination, with one or more other aspects or embodiments. Without limiting the foregoing description, certain non-limiting aspects of the disclosure numbered 1-155 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. A method of introducing an exogenous mitochondrion harvested from a donor cell into a recipient cell, the method comprising:
   a. genetically modifying the donor cell to express a fusion protein, the fusion protein comprising:
      i. a polypeptide capable of binding to an adhesion molecule on the recipient cell; and
      ii. a polypeptide comprising a mitochondrial outer membrane targeting domain;
   b. lysing the donor cell;
   c. isolating the exogenous mitochondrion from the donor cell; and
   d. contacting the recipient cell with the exogenous mitochondrion from the donor cell, wherein the exogenous mitochondrion comprises the fusion protein positioned in the outer membrane of the mitochondrion such that it is capable of binding to the adhesion molecule on the recipient cell; and
   wherein the exogenous mitochondrion is introduced into the recipient cell.

2. The method of 1, wherein the polypeptide capable of binding to the adhesion molecule on the recipient cell comprises an extracellular domain of an invasin protein.

3. The method of 2, wherein the invasin protein is derived from *Yersinia pseudotuberculosis*.

4. The method of 1 or 2, wherein the polypeptide capable of binding to the adhesion molecule on the recipient cell comprises an extracellular domain of an internalin protein.

5. The method of 4, wherein the internalin protein is derived from *Listeria monocytogenes*.

6. The method of any one of 1-5, wherein the polypeptide comprising a mitochondrial outer membrane targeting domain is a mitochondrial outer membrane targeting domain of human Translocase of Outer Mitochondrial Membrane 20 (Tomm20).

7. The method of any one of 1-6, wherein the lysing comprises exposing the donor cell to one or more lysis reagents and/or mechanical lysis conditions.

8. The method of 7, wherein the mechanical lysis conditions comprise using a dounce homogenizer.

9. The method of any one of 1-8, wherein the isolating comprises differential centrifugation.

10. The method of anyone of 1-9, further comprising contacting the recipient cell with a pore-forming polypeptide.

11. The method of 10, wherein the pore-forming polypeptide comprises a polypeptide derived from *Listeria monocytogenes*.

12. The method of 11, wherein the pore-forming polypeptide is listeriolysin O.

13. The method of anyone of 1-12, further comprising genetically modifying the exogenous mitochondrion from the donor cell.

14. The method of 13, wherein the genetically modifying comprises introducing an exogenous plasmid into the mitochondrion.

15. The method of 14, wherein the plasmid comprises a polynucleotide encoding an exogenous polypeptide.

16. The method of 15, wherein the polynucleotide is DNA.

17. The method of any one of 1-16, wherein the fusion protein comprises a linker peptide positioned between the polypeptide capable of binding to an adhesion molecule on the recipient cell and the polypeptide comprising a mitochondrial outer membrane targeting domain.

18. The method of 17, wherein the linker peptide comprises the amino acid sequence of GDPPVAT.

19. The method of any one of 1-18, wherein the fusion protein comprises the amino acid sequence set forth in FIG. 10A.

20. The method of anyone of 1-18, wherein the fusion protein comprises the amino acid sequence set forth in FIG. 10B.

21. The method of anyone of 1-18, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

22. The method of 21, wherein the mitochondrial outer membrane targeting domain of Tomm20 is not more than 33 amino acids in length.

23. The method of 21, wherein the mitochondrial outer membrane targeting domain of Tomm20 consists of the 33 N-terminal amino acids of Tomm20.

24. A method of producing a modified mitochondrion, the method comprising genetically modifying a donor cell to express a fusion protein, the fusion protein comprising:
   a. a polypeptide capable of binding to an adhesion molecule on a recipient cell; and
   b. a polypeptide comprising a mitochondrial outer membrane targeting domain;
   wherein the modified mitochondrion is produced and wherein the modified mitochondrion comprises the fusion protein positioned in the outer membrane of the modified mitochondrion such that it is capable of binding to the adhesion molecule on the recipient cell.

25. The method of 24, wherein the polypeptide capable of binding to the adhesion molecule on the recipient cell comprises an extracellular domain of an invasin protein.

26. The method of 25, wherein the invasin protein is derived from *Yersinia pseudotuberculosis*.

27. The method of 24 or 25, wherein the polypeptide capable of binding to the adhesion molecule on the recipient cell comprises an extracellular domain of an internalin protein.

28. The method of 27, wherein the internalin protein is derived from *Listeria monocytogenes*.

29. The method of any one of 24-28, wherein the polypeptide comprising a mitochondrial outer membrane targeting domain is a mitochondrial outer membrane targeting domain of human Translocase of Outer Mitochondrial Membrane 20 (Tomm20).

30. The method of any one of 24-29, further comprising lysing the donor cell.

31. The method of 30, wherein the lysing comprises exposing the donor cell to one or more lysis reagents and/or mechanical lysis conditions.

32. The method of 31, wherein the mechanical lysis conditions comprise using a dounce homogenizer.

33. The method of any one of 24-32, further comprising isolating the modified mitochondrion from the donor cell.

34. The method of 33, wherein the isolating comprises differential centrifugation.

35. The method of any one of 24-34, further comprising contacting the recipient cell with the modified mitochondrion from the donor cell.

36. The method of any one of 24-35, further comprising contacting the recipient cell with a pore-forming polypeptide.

37. The method of 36, wherein the pore-forming polypeptide comprises a polypeptide derived from *Listeria monocytogenes*.

38. The method of 37, wherein the pore-forming polypeptide is listeriolysin O.

39. The method of any one of 24-38, further comprising genetically modifying the modified mitochondrion from the donor cell.

40. The method of 39, wherein the genetically modifying comprises introducing an exogenous plasmid into the modified mitochondrion.

41. The method of 40, wherein the plasmid comprises a polynucleotide encoding an exogenous polypeptide.

42. The method of 41, wherein the polynucleotide is DNA.

43. The method of any one of 24-42, wherein the fusion protein comprises a linker peptide positioned between the polypeptide capable of binding to an adhesion molecule on the recipient cell and the polypeptide comprising a mitochondrial outer membrane targeting domain.

44. The method of 43, wherein the linker peptide comprises the amino acid sequence of GDPPVAT.

45. The method of any one of 24-44, wherein the fusion protein comprises the amino acid sequence set forth in FIG. 10A.

46. The method of any one of 24-44, wherein the fusion protein comprises the amino acid sequence set forth in FIG. 10B.

47. The method of any one of 24-44, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

48. The method of 47, wherein the mitochondrial outer membrane targeting domain of Tomm20 is not more than 33 amino acids in length.

49. The method of 47, wherein the mitochondrial outer membrane targeting domain of Tomm20 consists of the 33 N-terminal amino acids of Tomm20.

50. A method of producing a genetically modified mitochondrion, the method comprising genetically modifying a mitochondrion, wherein the mitochondrion comprises a fusion protein, the fusion protein comprising:
   a. a polypeptide capable of binding to an adhesion molecule on a recipient cell; and b. a polypeptide comprising a mitochondrial outer membrane targeting domain;
wherein the mitochondrion comprises the fusion protein positioned in the outer membrane of the mitochondrion such that it is capable of binding to the adhesion molecule on the recipient cell.

51. The method of 50, wherein the polypeptide capable of binding to the adhesion molecule on the recipient cell comprises an extracellular domain of an invasin protein.

52. The method of 51, wherein the invasin protein is derived from *Yersinia pseudotuberculosis.*

53. The method of 50 or 51, wherein the polypeptide capable of binding to the adhesion molecule on the recipient cell comprises an extracellular domain of an internalin protein.

54. The method of 53, wherein the internalin protein is derived from *Listeria monocytogenes.*

55. The method of any one of 50-54, wherein the polypeptide comprising a mitochondrial outer membrane targeting domain is a mitochondrial outer membrane targeting domain of human Translocase of Outer Mitochondrial Membrane 20 (Tomm20).

56. The method of any one of 50-55, further comprising contacting the recipient cell with the mitochondrion.

57. The method of any one of 50-56, further comprising contacting the recipient cell with a pore-forming polypeptide.

58. The method of 57, wherein the pore-forming polypeptide comprises a polypeptide derived from *Listeria monocytogenes.*

59. The method of 58, wherein the pore-forming polypeptide is listeriolysin O.

60. The method of 50, wherein the genetically modifying comprises introducing an exogenous plasmid into the mitochondrion.

61. The method of 60, wherein the plasmid comprises a polynucleotide encoding a an exogenous polypeptide.

62. The method of 61, wherein the polynucleotide is DNA.

63. The method of any one of 50-62, wherein the fusion protein comprises a linker peptide positioned between the polypeptide capable of binding to an adhesion molecule on the recipient cell and the polypeptide comprising a mitochondrial outer membrane targeting domain.

64. The method of 63, wherein the linker peptide comprises the amino acid sequence of GDPPVAT.

65. The method of any one of 50-64, wherein the fusion protein comprises the amino acid sequence set forth in FIG. 10A.

66. The method of any one of 50-64, wherein the fusion protein comprises the amino acid sequence set forth in FIG. 10B.

67. The method of any one of 50-64, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

68. The method of 67, wherein the mitochondrial outer membrane targeting domain of Tomm20 is not more than 33 amino acids in length.

69. The method of 67, wherein the mitochondrial outer membrane targeting domain of Tomm20 consists of the 33 N-terminal amino acids of Tomm20.

70. A method of introducing an exogenous mitochondrion harvested from a donor cell into a recipient cell, the method comprising contacting the recipient cell with the exogenous mitochondrion from the donor cell, wherein the exogenous mitochondrion comprises a fusion protein comprising a. a polypeptide capable of binding to an adhesion molecule on the recipient cell; and b. a polypeptide comprising a mitochondrial outer membrane targeting domain;

wherein the fusion protein is positioned in the outer membrane of the mitochondrion such that it is capable of binding to the adhesion molecule on the recipient cell; and wherein the exogenous mitochondrion is introduced into the recipient cell.

71. The method of 70, wherein the polypeptide capable of binding to the adhesion molecule on the recipient cell comprises an extracellular domain of an invasin protein.

72. The method of 71, wherein the invasin protein is derived from *Yersinia pseudotuberculosis.*

73. The method of 70 or 71, wherein the polypeptide capable of binding to the adhesion molecule on the recipient cell comprises an extracellular domain of an internalin protein.

74. The method of 73, wherein the internalin protein is derived from *Listeria* monocytogenes.

75. The method of any one of 70-74, wherein the polypeptide comprising a mitochondrial outer membrane targeting domain is a mitochondrial outer membrane targeting domain of human Translocase of Outer Mitochondrial Membrane 20 (Tomm20).

76. The method of any one of 70-75, further comprising contacting the recipient cell with a pore-forming polypeptide.

77. The method of 76, wherein the pore-forming polypeptide comprises a polypeptide derived from *Listeria monocytogenes.*

78. The method of 77, wherein the pore-forming polypeptide is listeriolysin O.

79. The method of any one of 70-78, further comprising genetically modifying the exogenous mitochondrion from the donor cell.

80. The method of 79, wherein the genetically modifying comprises introducing an exogenous plasmid into the mitochondrion.

81. The method of 80, wherein the plasmid comprises a polynucleotide encoding a an exogenous polypeptide.

82. The method of 81, wherein the polynucleotide is DNA.

83. The method of any one of 70-82, wherein the fusion protein comprises a linker peptide positioned between the polypeptide capable of binding to an adhesion molecule on the recipient cell and the polypeptide comprising a mitochondrial outer membrane targeting domain.

84. The method of 83, wherein the linker peptide comprises the amino acid sequence of GDPPVAT.

85. The method of any one of 70-84, wherein the fusion protein comprises the amino acid sequence set forth in FIG. 10A.

86. The method of any one of 70-84, wherein the fusion protein comprises the amino acid sequence set forth in FIG. 10B.

87. The method of any one of 70-84, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

88. The method of 87, wherein the mitochondrial outer membrane targeting domain of Tomm20 is not more than 33 amino acids in length.

89. The method of 87, wherein the mitochondrial outer membrane targeting domain of Tomm20 consists of the 33 N-terminal amino acids of Tomm20.

90. A modified mitochondrion comprising a fusion protein comprising:
   a. a polypeptide capable of binding to an adhesion molecule on a recipient cell; and
   b. a polypeptide comprising a mitochondrial outer membrane targeting domain;
   wherein the modified mitochondrion comprises the fusion protein positioned in the outer membrane of the modified mitochondrion such that it is capable of binding to the adhesion molecule on the recipient cell.

91. The modified mitochondrion of 90, wherein the polypeptide capable of binding to the adhesion molecule on the recipient cell comprises an extracellular domain of an invasin protein.

92. The modified mitochondrion of 91, wherein the invasin protein is derived from *Yersinia pseudotuberculosis*.

93. The modified mitochondrion of 90 or 91, wherein the polypeptide capable of binding to the adhesion molecule on the recipient cell comprises an extracellular domain of an internalin protein.

94. The modified mitochondrion of 93, wherein the internalin protein is derived from *Listeria monocytogenes*.

95. The modified mitochondrion of any one of 90-94, wherein the polypeptide comprising a mitochondrial outer membrane targeting domain is a mitochondrial outer membrane targeting domain of human Translocase of Outer Mitochondrial Membrane 20 (Tomm20).

96. The modified mitochondrion of any one of 90-95, wherein the fusion protein comprises a linker peptide positioned between the polypeptide capable of binding to an adhesion molecule on the recipient cell and the polypeptide comprising a mitochondrial outer membrane targeting domain.

97. The modified mitochondrion of 96, wherein the linker peptide comprises the amino acid sequence of GDPPVAT.

98. The modified mitochondrion of any one of 90-97, wherein the fusion protein comprises the amino acid sequence set forth in FIG. 10A.

99. The modified mitochondrion of any one of 90-97, wherein the fusion protein comprises the amino acid sequence set forth in FIG. 10B.

100. The modified mitochondrion of any one of 90-97, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

101. The modified mitochondrion of 100, wherein the mitochondrial outer membrane targeting domain of Tomm20 is not more than 33 amino acids in length.

102. The modified mitochondrion of 100, wherein the mitochondrial outer membrane targeting domain of Tomm20 consists of the 33 N-terminal amino acids of Tomm20.

103. The modified mitochondrion of any one of 90-102, comprising an exogenous nucleic acid encoding an exogenous polypeptide.

104. A genetically modified eukaryotic cell that is not a human cell in vivo, comprising a modified mitochondrion comprising a fusion protein comprising:
   a. a polypeptide capable of binding to an adhesion molecule on a recipient cell; and
   b. a polypeptide comprising a mitochondrial outer membrane targeting domain;
   wherein the modified mitochondrion comprises the fusion protein positioned in the outer membrane of the modified mitochondrion such that it is capable of binding to the adhesion molecule on the recipient cell.

105. The genetically modified eukaryotic cell of 104, wherein the polypeptide capable of binding to the adhesion molecule on the recipient cell comprises an extracellular domain of an invasin protein.

106. The genetically modified eukaryotic cell of 105, wherein the invasin protein is derived from *Yersinia pseudotuberculosis*.

107. The genetically modified eukaryotic cell of 104 or 105, wherein the polypeptide capable of binding to the adhesion molecule on the recipient cell comprises an extracellular domain of an internalin protein.

108. The genetically modified eukaryotic cell of 107, wherein the internalin protein is derived from *Listeria monocytogenes*.

109. The genetically modified eukaryotic cell of any one of 104-108, wherein the polypeptide comprising a mitochondrial outer membrane targeting domain is a mitochondrial outer membrane targeting domain of human Translocase of Outer Mitochondrial Membrane 20 (Tomm20).

110. The genetically modified eukaryotic cell of any one of 104-109, wherein the fusion protein comprises a linker peptide positioned between the polypeptide capable of binding to an adhesion molecule on the recipient cell and the polypeptide comprising a mitochondrial outer membrane targeting domain.

111. The genetically modified eukaryotic cell of 110, wherein the linker peptide comprises the amino acid sequence of GDPPVAT.

112. The genetically modified eukaryotic cell of any one of 104-111, wherein the fusion protein comprises the amino acid sequence set forth in FIG. 10A.

113. The genetically modified eukaryotic cell of any one of 104-111, wherein the fusion protein comprises the amino acid sequence set forth in FIG. 10B.

114. The genetically modified eukaryotic cell of any one of 104-111, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

115. The genetically modified eukaryotic cell of 114, wherein the mitochondrial outer membrane targeting domain of Tomm20 is not more than 33 amino acids in length.

116. The genetically modified eukaryotic cell of 114, wherein the mitochondrial outer membrane targeting domain of Tomm20 consists of the 33 N-terminal amino acids of Tomm20.

117. An isolated modified mitochondrion comprising a fusion protein comprising:
   a. a polypeptide capable of binding to an adhesion molecule on a recipient cell; and
   b. a polypeptide comprising a mitochondrial outer membrane targeting domain;
   wherein the modified mitochondrion comprises the fusion protein positioned in the outer membrane of the modified mitochondrion such that it is capable of binding to the adhesion molecule on the recipient cell.

118. The isolated modified mitochondrion of 117, wherein the polypeptide capable of binding to the adhesion molecule on the recipient cell comprises an extracellular domain of an invasin protein.

119. The isolated modified mitochondrion of 118, wherein the invasin protein is derived from *Yersinia pseudotuberculosis*.

120. The isolated modified mitochondrion of 117 or 118, wherein the polypeptide capable of binding to the adhesion molecule on the recipient cell comprises an extracellular domain of an internalin protein.

121. The isolated modified mitochondrion of 120, wherein the internalin protein is derived from *Listeria monocytogenes*.

122. The isolated modified mitochondrion of any one of 117-121, wherein the polypeptide comprising a mitochondrial outer membrane targeting domain is a mitochondrial outer membrane targeting domain of human Translocase of Outer Mitochondrial Membrane 20 (Tomm20).

123. The isolated modified mitochondrion of any one of 117-122, wherein the fusion protein comprises a linker peptide positioned between the polypeptide capable of binding to an adhesion molecule on the recipient cell and the polypeptide comprising a mitochondrial outer membrane targeting domain.

124. The isolated modified mitochondrion of 123, wherein the linker peptide comprises the amino acid sequence of GDPPVAT.

125. The isolated modified mitochondrion of anyone of 117-124, wherein the fusion protein comprises the amino acid sequence set forth in FIG. 10A.

126. The isolated modified mitochondrion of any one of 117-124, wherein the fusion protein comprises the amino acid sequence set forth in FIG. 10B.

127. The isolated modified mitochondrion of anyone of 117-124, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

128. The isolated modified mitochondrion of 127, wherein the mitochondrial outer membrane targeting domain of Tomm20 is not more than 33 amino acids in length.

129. The isolated modified mitochondrion of 127, wherein the mitochondrial outer membrane targeting domain of Tomm20 consists of the 33 N-terminal amino acids of Tomm20.

130. A fusion protein, comprising:
a. a polypeptide capable of binding to an adhesion molecule on a recipient cell; and
b. a polypeptide comprising a mitochondrial outer membrane targeting domain.

131. The fusion protein of 130, wherein the polypeptide capable of binding to the adhesion molecule on the recipient cell comprises an extracellular domain of an invasin protein.

132. The fusion protein of 131, wherein the invasin protein is derived from *Yersinia pseudotuberculosis*.

133. The fusion protein of 130 or 131, wherein the polypeptide capable of binding to the adhesion molecule on the recipient cell comprises an extracellular domain of an internalin protein.

134. The fusion protein of 133, wherein the internalin protein is derived from *Listeria monocytogenes*.

135. The fusion protein of any one of 130-134, wherein the polypeptide comprising a mitochondrial outer membrane targeting domain is a mitochondrial outer membrane targeting domain of human Translocase of Outer Mitochondrial Membrane 20 (Tomm20).

136. The fusion protein of any one of 130-135, wherein the fusion protein comprises a linker peptide positioned between the polypeptide capable of binding to an adhesion molecule on the recipient cell and the polypeptide comprising a mitochondrial outer membrane targeting domain.

137. The fusion protein of 136, wherein the linker peptide comprises the amino acid sequence of GDPPVAT.

138. The fusion protein of any one of 130-137, wherein the fusion protein comprises the amino acid sequence set forth in FIG. 10A.

139. The fusion protein of any one of 130-137, wherein the fusion protein comprises the amino acid sequence set forth in FIG. 10B.

140. The fusion protein of any one of 130-137, wherein the polypeptide comprising a mitochondrial outer membrane targeting domain is a mitochondrial outer membrane targeting domain of Tomm20, and wherein the mitochondrial outer membrane targeting domain of Tomm20 is less than 145 amino acids in length.

141. The fusion protein of 140, wherein the mitochondrial outer membrane targeting domain of Tomm20 is not more than 33 amino acids in length.

142. The fusion protein of 140, wherein the mitochondrial outer membrane targeting domain of Tomm20 consists of the 33 N-terminal amino acids of Tomm20.

143. A nucleic acid encoding the fusion protein of any one of 130-142.

144. A plasmid comprising the nucleic acid of any one of 130-143.

145. A method of treating a mitochondrial disease or disorder in a subject having a mitochondrial disease or disorder, comprising administering a therapeutically effective amount of the modified mitochondrion of any one of 90-103 or a cell comprising the modified mitochondrion of any one of 90-103 to the subject.

146. The method of 145, comprising administering a pore-forming polypeptide to the subject.

147. The method of 146, wherein the pore-forming polypeptide comprises a polypeptide derived from *Listeria monocytogenes*.

148. The method of 147, wherein the pore-forming polypeptide is listeriolysin O.

149. The method of any one of 145-148, wherein the mitochondrial disease is Leigh syndrome; Neuropathy, ataxia, and retinitis pigmentosa (NARP); Leber's hereditary optic neuropathy (LHON); Chronic progressive external ophthalmoplegia (CPEO); or mitochondrial diabetes.

150. The method of any one of 145-149, wherein the administering comprises administering a cell comprising the modified mitochondrion to the subject.

151. The method of 150, wherein the cell is derived from the subject.

152. A pharmaceutical composition comprising the modified mitochondrion of any one of 90-103 and a pharmaceutically acceptable carrier.

153. The pharmaceutical composition of 152, further comprising a pore-forming polypeptide.

154. The pharmaceutical composition of 153, wherein the pore-forming polypeptide comprises a polypeptide derived from *Listeria monocytogenes*.

155. The pharmaceutical composition of 153, wherein the pore-forming polypeptide is listeriolysin O.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); µl, microliter(s), pl, picoliter(s); s or sec, second(s); min, minute (s); h or hr, hour(s); aa, amino acid(s); kb, kilobase(s); nt, nucleotide(s); i.m., intramuscular(ly); i.p., intraperitoneal (ly); s.c., subcutaneous(ly); and the like.

Materials and Methods

Plasmids and Molecular Biology

The 145 N-terminal amino acids of human Tomm20 (translocase of outer mitochondrial membrane 20, NM_014765.3) was amplified from mApple-TOMM20-N-10 (addgene plasmid 54955), as was a shorter region of 33 N-terminal amino acids that is also sufficient for targeting to the mitochondrial outer membrane. These residues of Tomm20 were fused to the extracellular domain of invasin with a short linker 'GDPPVAT' (SEQ ID NO: 7) between them. The extracellular domain of invasin (*Yersinia pseudotuberculosis*, WP_071840289.1) was synthesized (IDT) in both native and human codon optimized forms. The P2A linker to matrix-targeted AcGFP was added using primers during amplification. The Cox8 fused mitochondrial matrix targeted AcGFP was amplified from pCAG-mito-GFP. All elements were combined by overlap extension PCR and cloned using NEB Assembly Mix into a backbone containing a TRE3G promoter, TY polyA signal, Tet-On 3G element, puromycin resistance cassette, and PiggyBac compatible transposase sites and core insulators. For visualization of outer membrane localization, the invasin extracellular domain was swapped for FusionRed florescent protein (also synthesized by IDT). For electroporation, a fusion element of sfGFP flanked by the N- and C-termini of human Cox2 and adjacent tRNAs (tRNA-Asp and tRNA-Lys) were synthesized and cloned downstream of an amplicon from HEK293T mitochondria containing elements of the D-loop including the heavy strand promoters and part of the mitochondrial 12S rRNA. For expression of mitochondrial-targeted restriction enzyme, EcoRI (*E. coli*) was synthesized (IDT), amplified, and cloned using NEB Assembly Mix downstream of the N-terminus of human Cox8 and a small linker 'GDPPVAT' (SEQ ID NO: 7) in a plasmid additionally containing a TRE3G promoter, TY polyA signal, Tet-On 3G element, puromycin resistance cassette, and PiggyBac compatible transposase sites and core insulators.

Cell Culturing and Transfection

HEK293T cells were cultured in DMEM supplemented with 10% FBS. Transfections were carried out using Lipofectamine 2000 (Thermo Fisher) according to manufacturer's protocol. To create stable lines of cells carrying inserts from plasmids with PiggyBac transposase sites, an additional plasmid was co-transfected to express the PiggyBac transposase. Stable cells were selected using puromycin (Thermo Fisher) at 2-5 μg/nl and gene expression was induced from the TRE3G promoter using doxycycline (Sigma) at 100-1,000 ng/ml. HEK293T cells depleted of their mitochondria (rho0) were created by culturing cells in supplemented media (DMEM+10% FBS+0.1 mM MEM NEAA, 2.5 mM sodium pyruvate, and 50 μg/ml uridine) with the addition of 50-100 ng/ul ethidium bromide. Alternately, cells were subjected to the expression of mitochondrial targeted EcoRI to deplete their mitochondria using the plasmid described above. To test for the loss of mtDNA, DNA was harvested from cells and qPCRs were run to test for the abundance of mtDNA (Cox2, ACGCTCAGGAAATAGAAACCGTC/GTGGTTTGCTCCACAGATTTCAG (SEQ ID NO: 3)); NAD12, CTCCCCTGAACTCTACACAACA/GGATGCGGTTGCTTGCGTG (SEQ ID NO: 4)) versus genomic DNA (EMX1, CATCCCCTTCTGTGAATGTTAGAC/GATTGGAGACACGGAGAGCAG (SEQ ID NO: 5); DYRK1, GAGCTGGTCTGTTGGAGAAGTC/CAATCCATAATCCCACGTTGCATG (SEQ ID NO: 6)). Additionally, the rho0 cells were assessed by challenge in a non-permissive media (DMEM+5% dialized FBS). At this time, the described invasin constructs have not been transfected into HEK cells to fully create the mtDonor.

Mitochondrial Isolation, Viability, Electroporation, and Delivery

Mitochondria were isolated from cells using kits (Thermo Scientific 89874; Sigma, MITOISO2) according to manufacturer's protocol. Amount of protein in the mitochondrial preparation was estimated using a BCA protein assay (Pierce 23225) according to manufacturer's protocol. Integrity of the mitochondrial outer membrane was assessed using a cytochrome c oxidase assay (Abeam ab239711; BioVision K287) according to manufacturer's protocol. At this time, the mtDonors with the invasin constructs have not been made, so isolations have so far been performed with unmodified or fluorescent mitochondria.

Electroporation of isolated mitochondria is performed in essence as previously described in Yoon et al. (2003) and Collombret et al. (1997), using a Gene Pulser Xcell (BioRad). After electroporation, transcription is assessed by RT-PCR (Invitrogen 18080200) with random hexamer primers and subsequent amplification of GFP cDNA, fluorescence is assessed by epifluorescence microscopy. mtDNA are delivered to recipient rho0 cells in the presence of recombinant Listeriolysin O.

Example 1A: Creation of mtDonors by Delivery of Bacterial Elements to the Outer Membrane of Mitochondria (Pophetic)

The first step to making mtDonors is the delivery of an element to the outer membrane of the mitochondria that will allow the mtDonors to be endocytosed into recipient cells. Such an element can be delivered using the mtDonor host cell. A plasmid is delivered to this cell (which can be episomal or can integrate into the host cell nuclear genome) that encodes a fusion protein of the N-terminus of Tomm20 (to allow for localization to the outer membrane) and the extracellular region of Invasin including its integrin-binding domain (to allow for uptake by recipient cells) (FIGS. 1 and 2). Localization of fusion proteins to the outer membrane of mitochondria using the 145 N-terminal amino acids of Tomm20 has been previously shown. Either the 145 N-terminal amino acids of Tomm20 or the 33 N-terminal amino acids of Tomm20 may be used for targeting.

The 497 C-terminal amino acids of invasin have been shown to bind to integrins and mediate entry of bacteria into mammalian cells. The 497 C-terminal amino acids of invasin from *Yersinia pseudotuberculosis* can be used in the disclosed compositions and methods, both in native and human codon optimized forms. However, other bacteria express variants of invasin that could also be used. Moreover, other proteins, including internalin, have a similar function and could also be used. A fusion protein of a mitochondrial outer membrane protein with the extracellular domain of invasin or similar invasive proteins has never been reported.

An arrangement that can be used to test these elements includes an inducible promoter (TRE3G) and a mitochondrial matrix targeted green fluorescent protein separated from the outer membrane targeted element (using fusion of AcGFP to part of the mitochondrial matrix protein Cox8) by a P2A sequence, to generate a ribosomal skip and protein separation.

Figure 5:
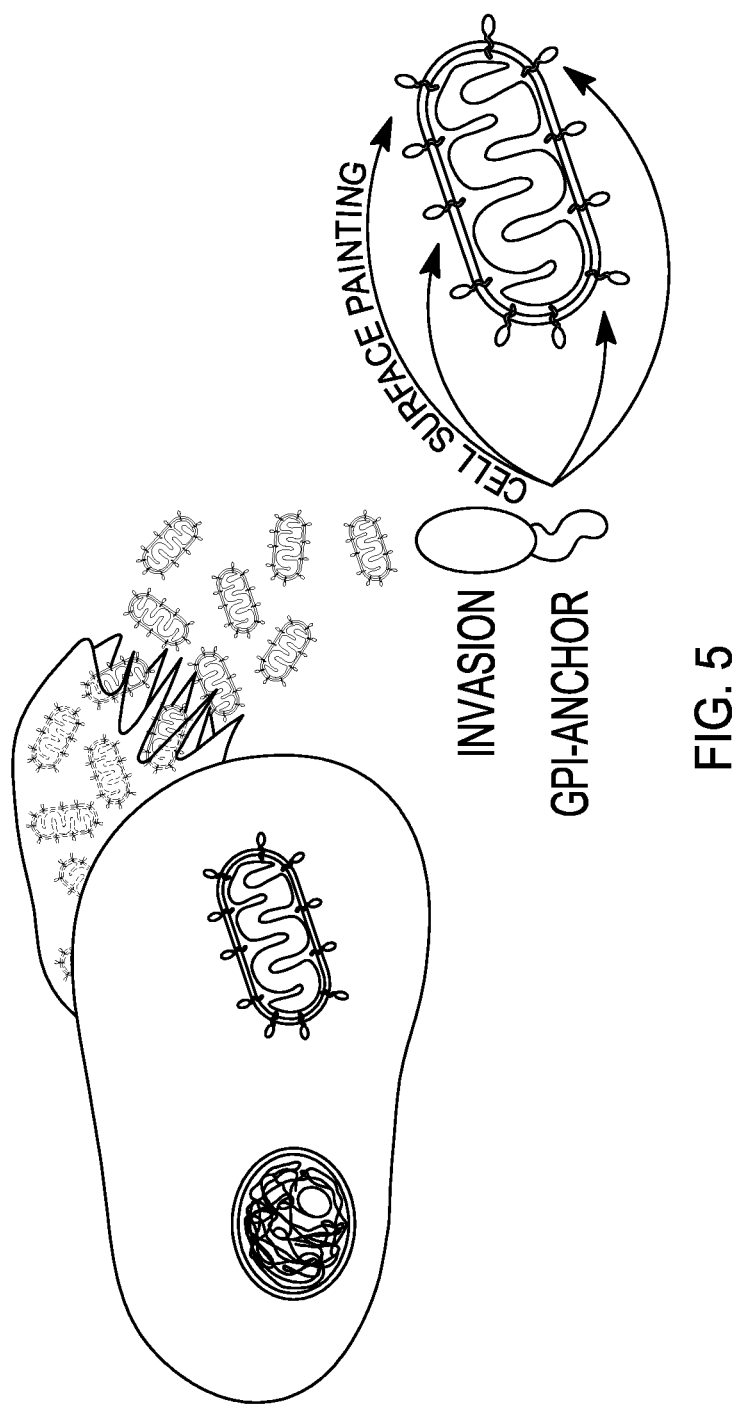
FIG. 5 depicts a schematic image showing delivery of GPI-anchored invasin extracellular domain to the mitochondrial outer membrane in accordance with an exemplary embodiment of the present disclosure.

An alternative method of delivering invasin is to isolate mitochondria and 'paint' them with a purified, Glycosylphosphatidylinisotol (GPI)-anchored, recombinant form of invasin, as shown schematically in FIG. 5.

Figure 3:
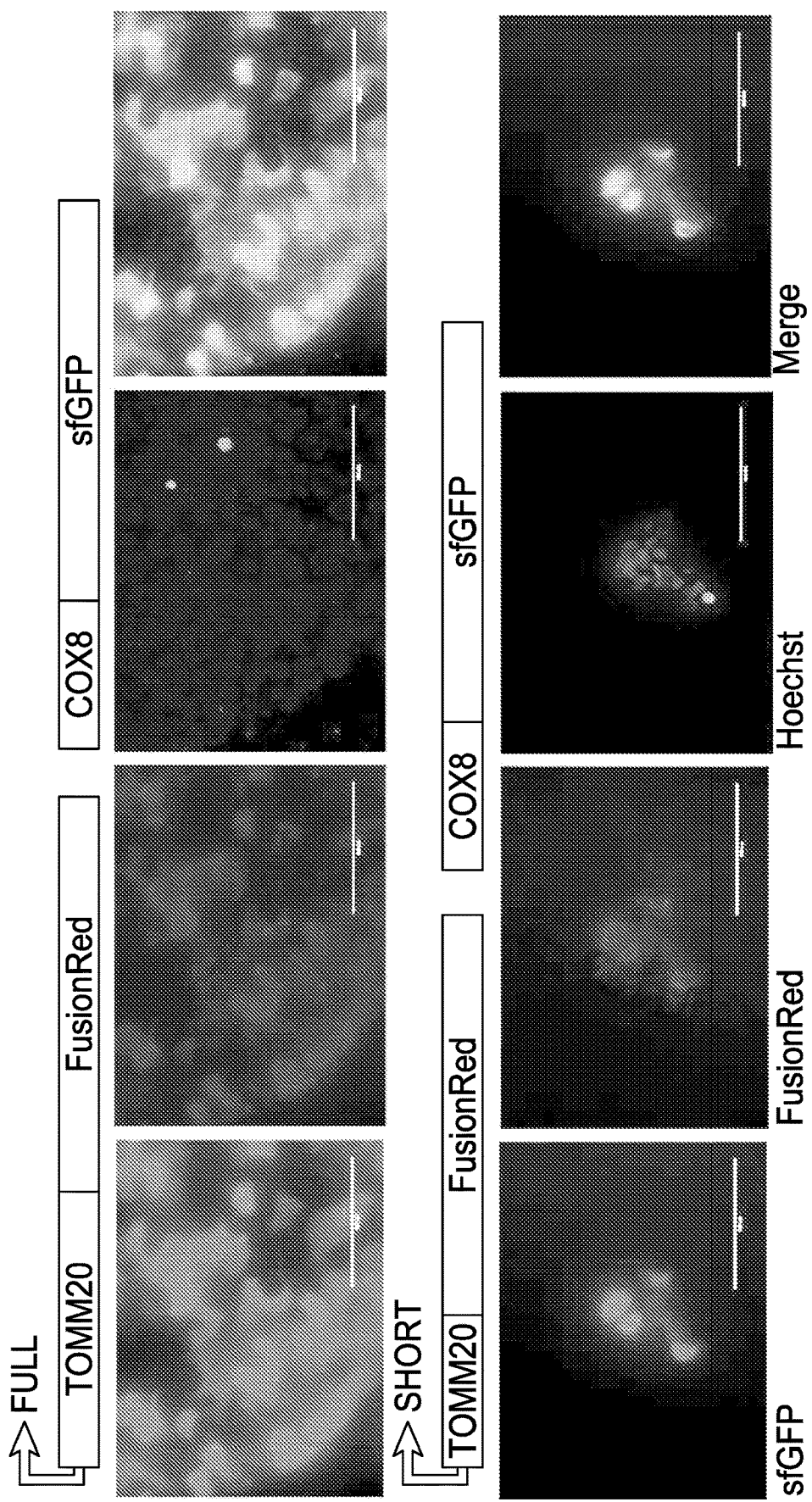
FIG. 3 depicts the localization of FusionRed to the outer membrane of mitochondria when fused to a full length or shortened Translocase of Outer Mitochondrial Membrane 20 (Tomm20) polypeptide. Scale bars 100 μm.

Example 1B: Creation of mtDonors by Delivery of Bacterial Elements to the Outer Membrane of Mitochondria In support of prophetic Example 1A, it is demonstrated herein that a 33 N-terminal fragment of Tomm20 is sufficient for localization to the mitochondrion outer membrane, with a red fluorescent protein, FusionRed, standing in for invasin (FIG. 3).

Figure 4:
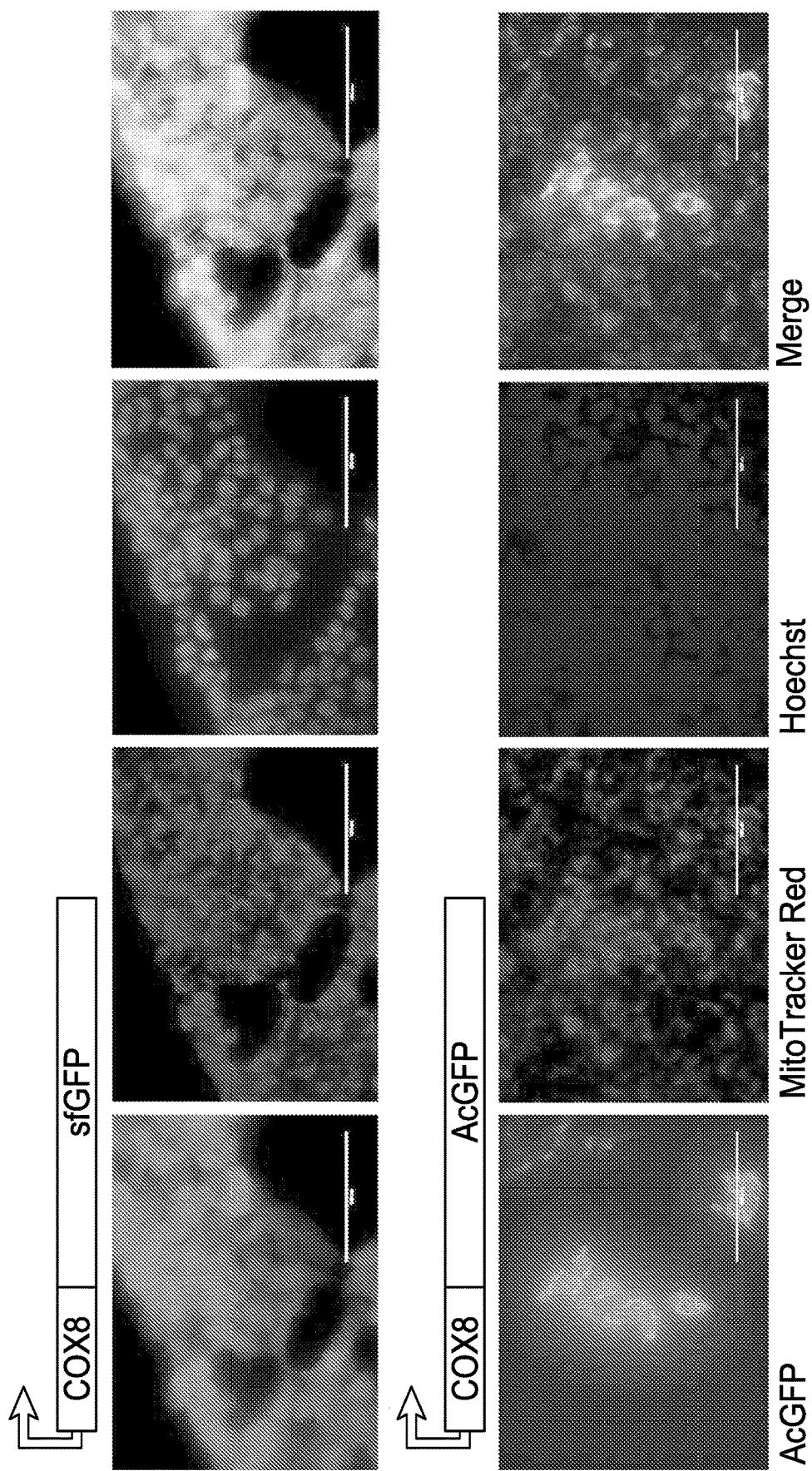
FIG. 4 depicts matrix localization of AcGFP, but not sfGFP, when fused to identical fragments of Cox8. Scale bars 100 μm.

In addition, it is demonstrated herein that a super folder variant of GFP is not well trafficked to the mitochondrial matrix with the Cox8 fusion, whereas the AcGFP variant is (FIG. 4). The delivery of these elements to a cultured host cell (e.g. HEK293T) is achieved through lipofection and expression of the genes is controlled by doxycycline.

Example 2A: Isolation of mtDonors (Prophetic)

MtDonors harboring the mitochondrial outer membrane targeted invasin extracellular domain are isolated by first lysing the host cell with reagents or physical means (dounce homogenizer). Mitochondria in the lysate are then isolated by differential centrifugation. Isolated mtDonor abundance can be estimated by protein concentration using a BCA protein assay.

Example 2B: Isolation of mtDonors

Figure 6:
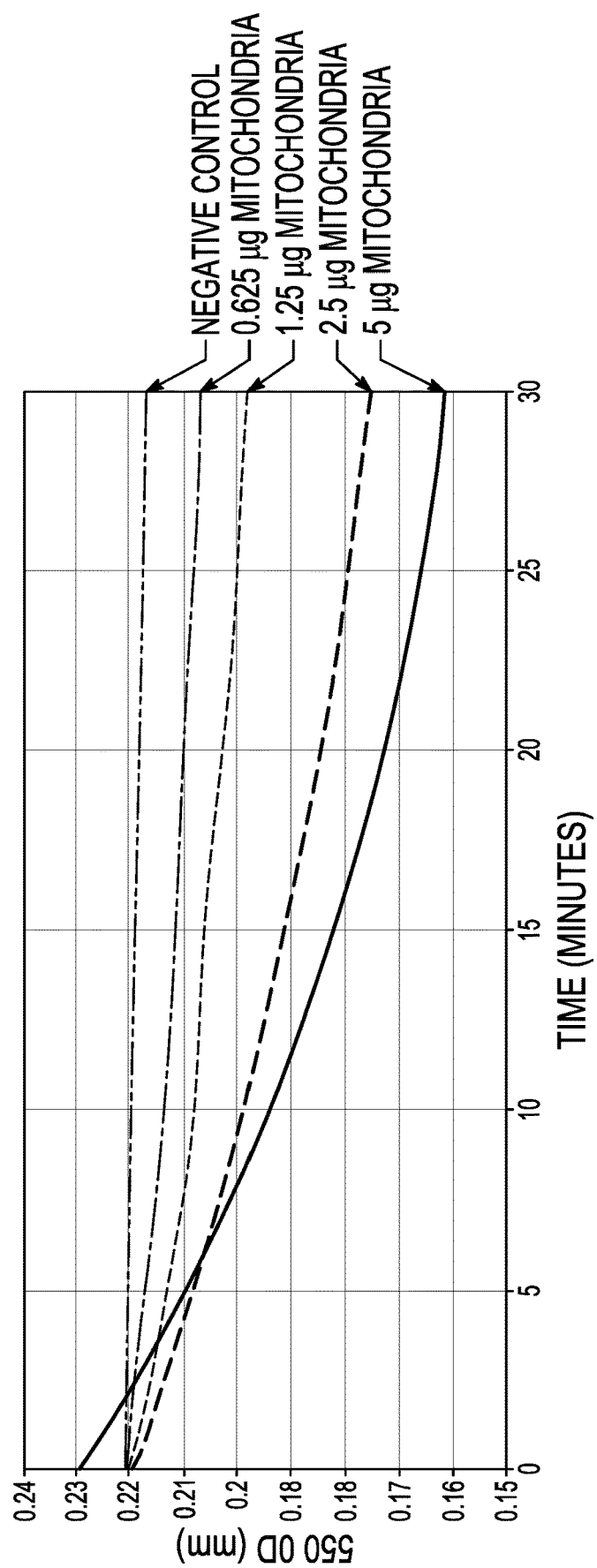
FIG. 6 depicts results of a Cytochrome C oxidase assay showing intact outer membranes of isolated mitochondria as evidenced by oxidation of ferrocytochrome c with increasing amounts of isolated mitochondria.

In support of prophetic Example 2A, the above method was performed with unmodified and fluorescent mitochondria. Determination of an intact outer membrane (necessary for the transfer of mtDonors) was assessed by cytochorome c oxidase assay (FIG. 6).

Example 3: Gene Transfer (Prophetic)

Figure 7:
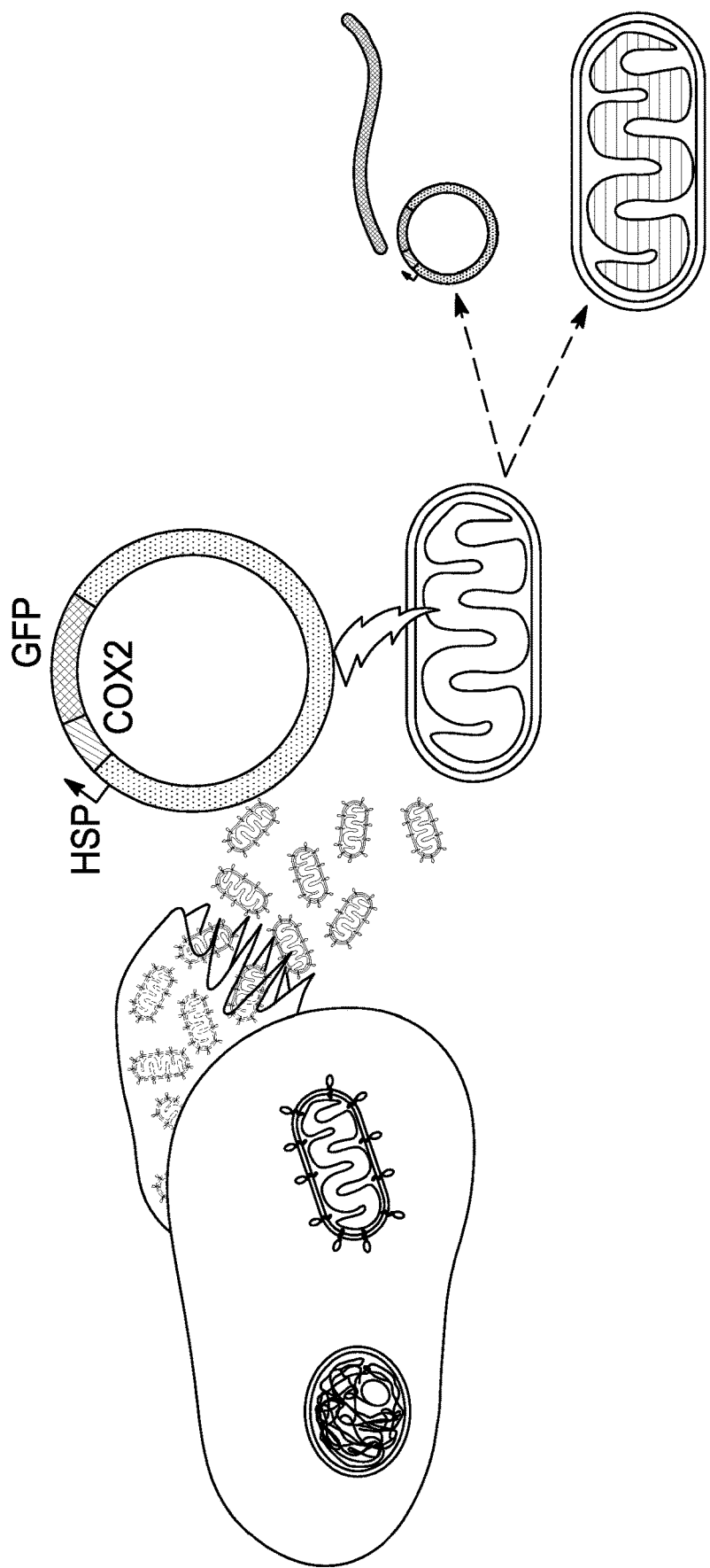
FIG. 7 depicts a schematic image of the electroporation of mitochondria with an exogenous plasmid according to an exemplary embodiment of the present disclosure.

To transform the isolated mtDonor with new nucleotides before delivery to a recipient cell, electroporation is used. Successful transformation is determined by the production of a transcript or protein within the mitochondria from a plasmid delivered by electroporation, shown schematically in FIG. 7. The plasmid contains the heavy-strand promotors from human mitochondria driving the expression of a transcript including a transgene (GFP shown as a non-limiting example). The GFP is flanked by mitochondrial tRNAs (for transcript processing) and N-terminal and C-terminal regions of Cox2 (to aid in mitochondrial translation). The GFP itself is designed for protein production using the mitochondrial codon organization. After the plasmid is delivered to the mitochondrial matrix by electroporation, a transcript (assessed by RT-PCR) and a protein (assessed by fluorescence) are produced.

Figure 8:
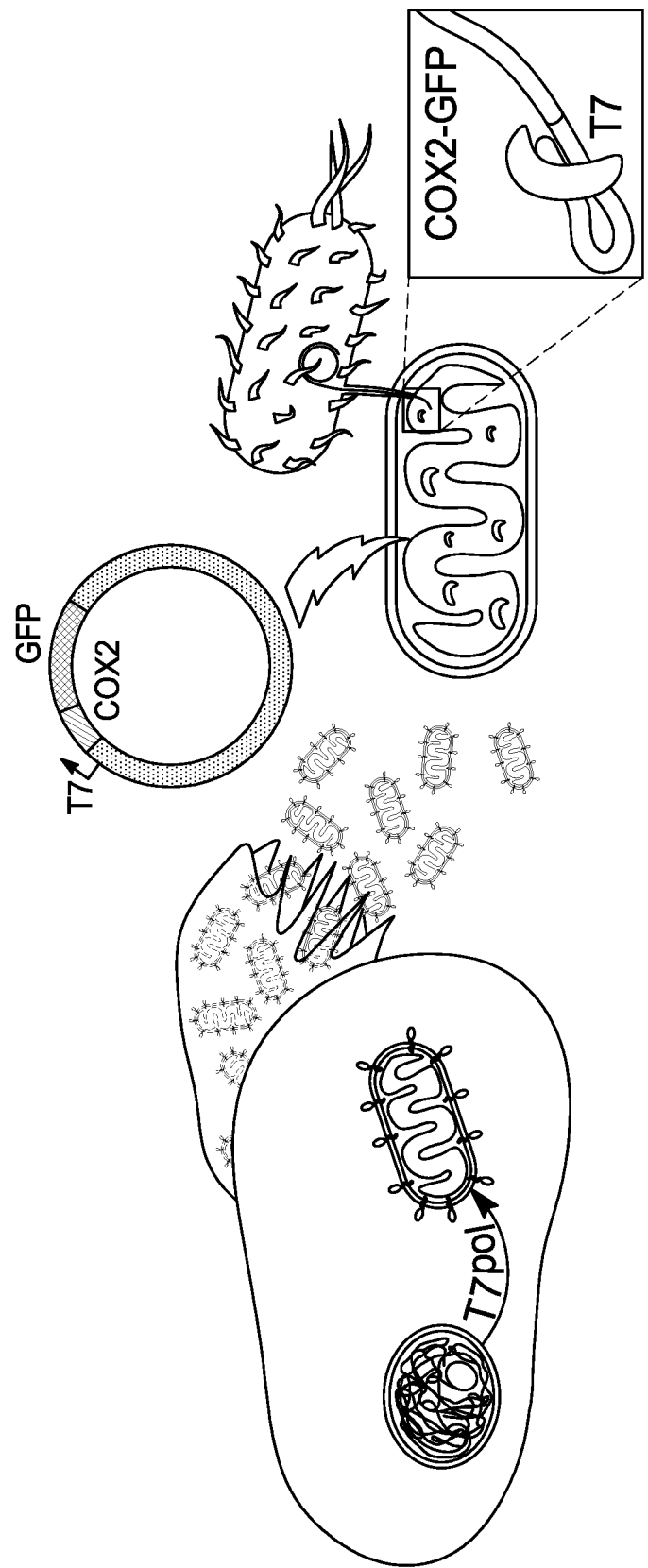
FIG. 8 depicts a schematic image of conjugation or electroporation of genetic elements into mitochondria that can be transcribed by a polymerase provided by the host cell according to an exemplary embodiment of the present disclosure.

An alternate strategy uses a T7 polymerase to drive transcription. This T7 polymerase is expressed from the nuclear genome with a mitochondrial targeting region. A plasmid encoding a transgene (GFP shown as a non-limiting example) with the same flanking regions outlined above downstream of a T7 promoter is electroporated into mitochondria. Alternately, bacteria can be used to conjugate the nucleotide elements into isolated mitochondria (FIG. 8).

Example 4: Delivery of mtDonors to a Recipient Cell Cytoplasm (Prophetic)

Figure 9:
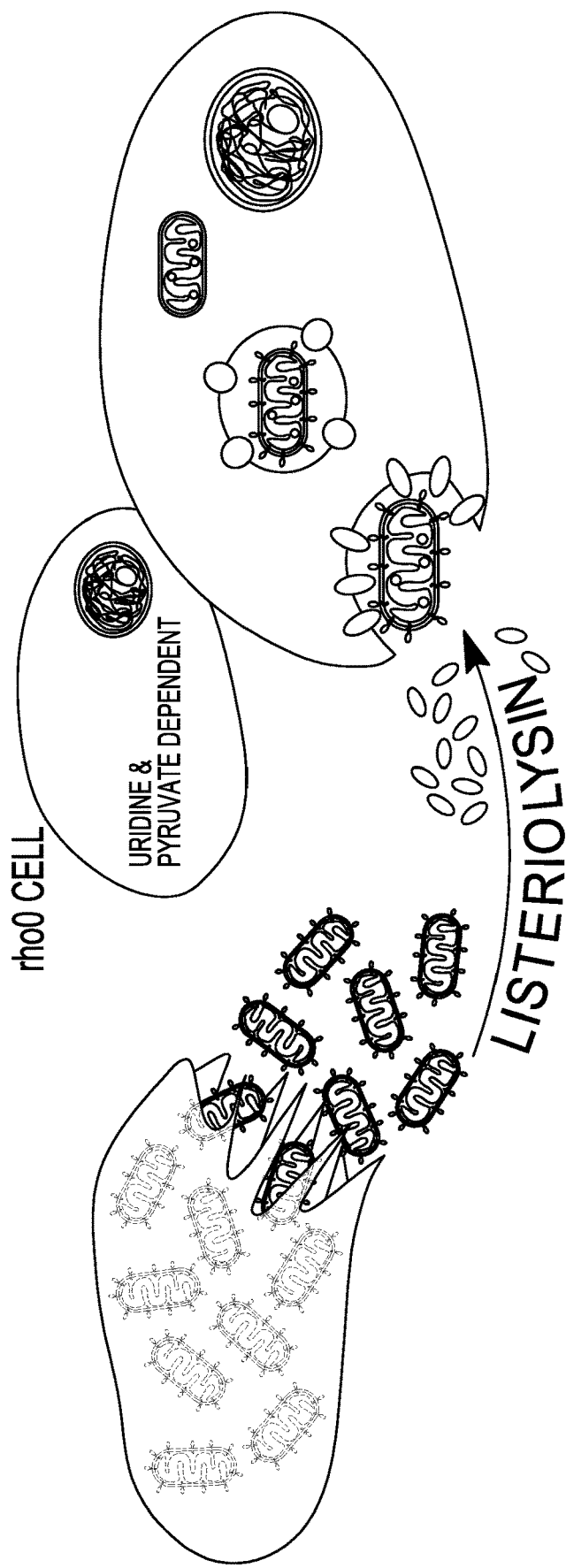
FIG. 9 depicts a schematic image of delivery of isolated mtDonors along with listeriolysin O to a cell depleted of its endogenous mtDNA according to an exemplary embodiment of the present disclosure.

The isolated mtDonors, coated with the extracellular domain of invasin (or similar protein) and containing wild-type or edited mtDNA are next delivered to a recipient cell population. The mtDonors will be endocytosed into a phagosome, which would eventually fuse with a lysosome and destroy the enclosed material. To avoid that fate, the mtDonors are supplied along with listeriolysin O. Listeriolysin O is a pore-forming protein derived from *Listeria monocytogenes*. The pore inserts into membranes and is endocytosed along with the mtDonors. The Listeriolysin pore is activated by the acidic pH of the phagosome and phagolysosome, disrupting the compartment and releasing the mtDonors as shown schematically in FIG. 9.

Verification of the delivery is determined by rescuing an mtDNA depleted cell (rho0). These cells can grow without their functional mitochondria, but only when provided with uridine and pyruvate supplemented media. The mtDonors are delivered to rho0 cells (e.g. rho0 HEK293T cells), then the cells are challenged with growth in an unsupplemented media.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

BIBLIOGRAPHY

1. Taylor, R. W. & Turnbull, D. M. Mitochondrial DNA mutations in human disease. *Nature reviews. Genetics* 6, 389-402. doi:10.1038/nrg1606 (2005).
2. Petersen, K. F. et al. Mitochondrial dysfunction in the elderly: possible role in insulin resistance. *Science* 300, 1140-1142. doi:10.1126/science.1082889 (2003).
3. Bender, A. et al. High levels of mitochondrial DNA deletions in substantia nigra neurons in aging and Parkinson disease. *Nat Genet* 38, 515-517, doi:10.1038/ng1769 (2006).
4. Wallace. D. C. Mitochondrial genetics: a paradigm for aging and degenerative diseases?*Science* 256, 628-632 (1992).
5. Smith, R., 3rd, Huston, M. M., Jenkins, R. N., Huston, D. P. & Rich, R. R. Mitochondria control expression of a murine cell surface antigen. *Nature* 306, 599-601 (1983).
6. Huston, M. M., Smith, R., 3rd, Hull, R., Huston, D. P. & Rich, R. R. Mitochondrial modulation of maternally transmitted antigen: analysis of cell hybrids. *Proc Natl Acad Sci USA* 82, 3286-3290 (1985).
7. Kanaji, S., Iwahashi, J., Kida, Y., Sakaguchi, M. & Mihara, K. Characterization of the signal that directs Tom20 to the mitochondrial outer membrane. *J Cell Biol* 151, 277-288 (2000).
8. Yoon, Y. G. & Koob, M. D. Efficient cloning and engineering of entire mitochondrial genomes in *Escherichia coli* and transfer into transcriptionally active mitochondria. *Nucleic acids research* 31, 1407-1415 (2003).
9. Collombet, J. M., Wheeler. V. C., Vogel, F. & Coutelle, C. Introduction of plasmid DNA into isolated mitochondria by electroporation. A novel approach toward gene correction for mitochondrial disorders. *J Biol Chem* 272, 5342-5347 (1997).

The invention is described with reference to various specific and preferred embodiments and techniques. However, it should be understood that many variations and modifications may be made while remaining within its scope. All referenced publications, patents and patent documents are intended to be incorporated by reference, as though individually incorporated by reference.

What is claimed is:

1. An in vitro method of introducing an exogenous modified mitochondrion harvested from a donor cell into a recipient cell, the method comprising:
   a. genetically modifying the donor cell to express a fusion protein, the fusion protein comprising:
      i. a polypeptide capable of binding to an adhesion molecule on the recipient cell and comprising a portion of an invasin or internalin; and
      ii. a polypeptide comprising a mitochondrial outer membrane targeting domain;
   b. lysing the donor cell;
   c. isolating the exogenous modified mitochondrion from the lysed donor cell of b); and
   d. contacting the recipient cell with the isolated exogenous modified mitochondrion from the donor cell of c) and a pore-forming polypeptide, wherein the exogenous modified mitochondrion comprises the fusion protein positioned in the outer membrane of the mitochondrion such that it is capable of binding to the adhesion molecule on the recipient cell; and
   wherein the exogenous modified mitochondrion is introduced into the recipient cell,
   wherein the donor and recipient cells are mammalian cells.

2. The method of claim 1, wherein the polypeptide capable of binding to the adhesion molecule on the recipient cell comprises an extracellular domain of an invasin or internalin protein.

3. The method of claim 1, wherein the polypeptide comprising a mitochondrial outer membrane targeting domain is a mitochondrial outer membrane targeting domain of human Translocase of Outer Mitochondrial Membrane 20 (Tomm20).

4. The method of claim 1, wherein the fusion protein comprises a linker peptide positioned between the polypeptide capable of binding to an adhesion molecule on the recipient cell and the polypeptide comprising a mitochondrial outer membrane targeting domain.

5. A method of producing a modified mitochondrion, the method comprising genetically modifying a eukaryotic donor cell to express a fusion protein, the fusion protein comprising:
   a. a polypeptide capable of binding to an adhesion molecule on a eukaryotic recipient cell; and
   b. a polypeptide comprising a mitochondrial outer membrane targeting domain;
   wherein the modified mitochondrion is produced and wherein the modified mitochondrion comprises the fusion protein positioned in the outer membrane of the modified mitochondrion such that it is capable of binding to the adhesion molecule on the recipient cell,
   wherein the polypeptide capable of binding to the adhesion molecule on the recipient cell comprises an extracellular domain of an invasin or internalin protein.

6. The method of claim 5, wherein the polypeptide comprising a mitochondrial outer membrane targeting domain is a mitochondrial outer membrane targeting domain of human Translocase of Outer Mitochondrial Membrane 20 (Tomm20).

7. The method of claim 5, further comprising lysing the donor cell after producing modified mitochondria in the donor cell.

8. The method of claim 5, wherein the fusion protein comprises a linker peptide positioned between the polypeptide capable of binding to an adhesion molecule on the recipient cell and the polypeptide comprising a mitochondrial outer membrane targeting domain.

9. A modified mammalian mitochondrion comprising a fusion protein comprising:
   a. a polypeptide comprising an adhesion molecule binding domain; and
   b. a polypeptide comprising a mitochondrial outer membrane targeting domain;
   wherein the modified mitochondrion comprises the fusion protein positioned in the outer membrane of the modified mitochondrion,
   wherein the polypeptide comprising the adhesion molecule domain comprises an extracellular domain of an invasin or internalin protein.

10. The modified mitochondrion of claim 9, wherein the polypeptide comprising a mitochondrial outer membrane targeting domain is a mitochondrial outer membrane targeting domain of human Translocase of Outer Mitochondrial Membrane 20 (Tomm20).

11. The modified mitochondrion of claim 9, wherein the fusion protein comprises a linker peptide positioned between the polypeptide capable of binding to an adhesion molecule on the recipient cell and the polypeptide comprising a mitochondrial outer membrane targeting domain.

12. The modified mitochondrion of claim 9, comprising an exogenous nucleic acid encoding an exogenous polypeptide.

13. A genetically modified eukaryotic cell that is not a human cell in vivo, comprising the modified mitochondrion of claim 9.

14. A fusion protein, comprising:
   a. a polypeptide capable of binding to an adhesion molecule on a recipient cell; and
   b. a polypeptide comprising a mitochondrial outer membrane targeting domain,
   wherein the polypeptide capable of binding to the adhesion molecule on the recipient cell comprises an extracellular domain of an invasin or internalin protein.

15. The fusion protein of claim 14, wherein the polypeptide comprising a mitochondrial outer membrane targeting domain is a mitochondrial outer membrane targeting domain of human Translocase of Outer Mitochondrial Membrane 20 (Tomm20).

16. The fusion protein of claim 14, wherein the fusion protein comprises a linker peptide positioned between the polypeptide capable of binding to an adhesion molecule on the recipient cell and the polypeptide comprising a mitochondrial outer membrane targeting domain.

17. A pharmaceutical composition comprising the modified mitochondrion of claim 9 and a pharmaceutically acceptable carrier.

* * * * *

SEQUENCE LISTING

```
<160> NUMBER OF SEQ ID NOS: 12

<210> SEQ ID NO 1
<211> LENGTH: 14
<212> TYPE: PRT
<213> ORGANISM: Artificial Sequence
<220> FEATURE:
<223> OTHER INFORMATION: A synthetic polypeptide

<400> SEQUENCE: 1

Lys Leu Ala Lys Leu Ala Lys Lys Leu Ala Lys Leu Ala Lys
1               5                   10

<210> SEQ ID NO 2
<211> LENGTH: 7
<212> TYPE: PRT
<213> ORGANISM: Artificial Sequence
<220> FEATURE:
<223> OTHER INFORMATION: A synthetic polypeptide

<400> SEQUENCE: 2

Gly Asp Pro Pro Val Ala Thr
1               5

<210> SEQ ID NO 3
<211> LENGTH: 23
<212> TYPE: DNA
<213> ORGANISM: Artificial Sequence
<220> FEATURE:
<223> OTHER INFORMATION: A synthetic oligonucleotide

<400> SEQUENCE: 3
acgctcagga aatagaaacc gtc                                              23

<210> SEQ ID NO 4
<211> LENGTH: 23
<212> TYPE: DNA
<213> ORGANISM: Artificial Sequence
<220> FEATURE:
<223> OTHER INFORMATION: A synthetic oligonucleotide

<400> SEQUENCE: 4
gtggtttgct ccacagattt cag                                              23

<210> SEQ ID NO 5
<211> LENGTH: 22
<212> TYPE: DNA
<213> ORGANISM: Artificial Sequence
<220> FEATURE:
<223> OTHER INFORMATION: A synthetic oligonucleotide

<400> SEQUENCE: 5
ctcccctgaa ctctacacaa ca                                               22
```

<210> SEQ ID NO 6
<211> LENGTH: 19
<212> TYPE: DNA
<213> ORGANISM: Artificial Sequence
<220> FEATURE:
<223> OTHER INFORMATION: A synthetic oligonucleotide

<400> SEQUENCE: 6
ggatgcggtt gcttgcgtg                                                19

<210> SEQ ID NO 7
<211> LENGTH: 24
<212> TYPE: DNA
<213> ORGANISM: Artificial Sequence
<220> FEATURE:
<223> OTHER INFORMATION: A synthetic oligonucleotide

<400> SEQUENCE: 7 catcccttc tgtgaatgtt agac                                           24

<210> SEQ ID NO 8
<211> LENGTH: 21
<212> TYPE: DNA
<213> ORGANISM: Artificial Sequence
<220> FEATURE:
<223> OTHER INFORMATION: A synthetic oligonucleotide

<400> SEQUENCE: 8
gattggagac acggagagca g                                             21

<210> SEQ ID NO 9
<211> LENGTH: 22
<212> TYPE: DNA
<213> ORGANISM: Artificial Sequence
<220> FEATURE:
<223> OTHER INFORMATION: A synthetic oligonucleotide

<400> SEQUENCE: 9
gagctggtct gttggagaag tc                                            22

<210> SEQ ID NO 10
<211> LENGTH: 24
<212> TYPE: DNA
<213> ORGANISM: Artificial Sequence
<220> FEATURE:
<223> OTHER INFORMATION: A synthetic oligonucleotide

<400> SEQUENCE: 10
caatccataa tcccacgttg catg                                          24

<210> SEQ ID NO 11
<211> LENGTH: 649
<212> TYPE: PRT
<213> ORGANISM: Artificial Sequence
<220> FEATURE:
<223> OTHER INFORMATION: A synthetic polypeptide

<400> SEQUENCE: 11

Met Val Gly Arg Asn Ser Ala Ile Ala Ala Gly Val Cys Gly Ala Leu
1               5                   10                  15

Phe Ile Gly Tyr Cys Ile Tyr Phe Asp Arg Lys Arg Arg Ser Asp Pro
            20                  25                  30

Asn Phe Lys Asn Arg Leu Arg Glu Arg Arg Lys Lys Gln Lys Leu Ala
        35                  40                  45

```
Lys Glu Arg Ala Gly Leu Ser Lys Leu Pro Asp Leu Lys Asp Ala Glu
         50                  55                  60

Ala Val Gln Lys Phe Phe Leu Glu Glu Ile Gln Leu Gly Glu Glu Leu
 65                  70                  75                  80

Leu Ala Gln Gly Glu Tyr Glu Lys Gly Val Asp His Leu Thr Asn Ala
                     85                  90                  95

Ile Ala Val Cys Gly Gln Pro Gln Leu Leu Gln Val Leu Gln Gln
                100                 105                 110

Thr Leu Pro Pro Pro Val Phe Gln Met Leu Leu Thr Lys Leu Pro Thr
             115                 120                 125

Ile Ser Gln Arg Ile Val Ser Ala Gln Ser Leu Ala Glu Asp Asp Val
         130                 135                 140

Glu Gly Asp Pro Pro Val Ala Thr Asn Ser Phe Thr Leu Ser Val Thr
145                 150                 155                 160

Val Gln Gln Pro Gln Leu Thr Leu Thr Ala Ala Val Ile Gly Asp Gly
                 165                 170                 175

Ala Pro Ala Asn Gly Lys Thr Ala Ile Thr Val Glu Phe Thr Val Ala
                 180                 185                 190

Asp Phe Glu Gly Lys Pro Leu Ala Gly Gln Glu Val Val Ile Thr Thr
         195                 200                 205

Asn Asn Gly Ala Leu Pro Asn Lys Ile Thr Glu Lys Thr Asp Ala Asn
210                 215                 220

Gly Val Ala Arg Ile Ala Leu Thr Asn Thr Thr Asp Gly Val Thr Val
225                 230                 235                 240

Val Thr Ala Glu Val Glu Gly Gln Arg Gln Ser Val Asp Thr His Phe
                 245                 250                 255

Val Lys Gly Thr Ile Thr Ala Asp Lys Ser Thr Leu Thr Ala Val Pro
                 260                 265                 270

Thr Ser Ile Ile Ala Asp Gly Leu Met Ala Ser Thr Ile Thr Leu Glu
         275                 280                 285

Leu Lys Asp Thr Tyr Gly Asp Pro Gln Ala Gly Ala Asn Val Ala Phe
         290                 295                 300

Asp Thr Thr Leu Gly Asn Met Gly Val Ile Thr Asp His Asn Asp Gly
305                 310                 315                 320

Thr Tyr Ser Ala Pro Leu Thr Ser Thr Thr Leu Gly Val Ala Thr Val
                 325                 330                 335

Thr Val Lys Val Asp Gly Ala Ala Phe Ser Val Pro Ser Val Thr Val
             340                 345                 350

Asn Phe Thr Ala Asp Pro Ile Pro Asp Ala Gly Arg Ser Ser Phe Thr
         355                 360                 365

Val Ser Thr Pro Asp Ile Leu Ala Asp Gly Thr Met Ser Ser Thr Leu
     370                 375                 380

Ser Phe Val Pro Val Asp Lys Asn Gly His Phe Ile Ser Gly Met Gln
385                 390                 395                 400

Gly Leu Ser Phe Thr Gln Asn Gly Val Pro Val Ser Ile Ser Pro Ile
                 405                 410                 415

Thr Glu Gln Pro Asp Ser Tyr Thr Ala Thr Val Val Gly Asn Thr Ala
             420                 425                 430

Gly Asp Val Thr Ile Thr Pro Gln Val Asp Thr Leu Ile Leu Ser Thr
         435                 440                 445

Leu Gln Lys Lys Ile Ser Leu Phe Pro Val Pro Thr Leu Thr Gly Ile
     450                 455                 460
```

-continued

Leu Val Asn Gly Gln Asn Phe Ala Thr Asp Lys Gly Phe Pro Lys Thr
465                 470                 475                 480

Ile Phe Lys Asn Ala Thr Phe Gln Leu Gln Met Asp Asn Asp Val Ala
            485                 490                 495

Asn Asn Thr Gln Tyr Glu Trp Ser Ser Ser Phe Thr Pro Asn Val Ser
            500                 505                 510

Val Asn Asp Gln Gly Gln Val Thr Ile Thr Tyr Gln Thr Tyr Ser Glu
            515                 520                 525

Val Ala Val Thr Ala Lys Ser Lys Lys Phe Pro Ser Tyr Ser Val Ser
            530                 535                 540

Tyr Arg Phe Tyr Pro Asn Arg Trp Ile Tyr Asp Gly Thr Ser Leu
545                 550                 555                 560

Val Ser Ser Leu Glu Ala Ser Arg Gln Cys Gln Gly Ser Asp Met Ser
            565                 570                 575

Ala Val Leu Glu Ser Ser Arg Ala Thr Asn Gly Thr Arg Ala Pro Asp
            580                 585                 590

Gly Thr Leu Trp Gly Glu Trp Gly Ser Leu Thr Ala Tyr Ser Ser Asp
            595                 600                 605

Trp Gln Ser Gly Glu Tyr Trp Val Lys Lys Thr Ser Thr Asp Phe Glu
            610                 615                 620

Thr Met Asn Met Asp Thr Gly Ala Leu Val Gln Gly Pro Ala Tyr Leu
625                 630                 635                 640

Ala Phe Pro Leu Cys Ala Leu Ala Ile
            645

<210> SEQ ID NO 12
<211> LENGTH: 537
<212> TYPE: PRT
<213> ORGANISM: Artificial Sequence
<220> FEATURE:
<223> OTHER INFORMATION: A synthetic polypeptide

<400> SEQUENCE: 12

Met Val Gly Arg Asn Ser Ala Ile Ala Ala Gly Val Cys Gly Ala Leu
1               5                   10                  15

Phe Ile Gly Tyr Cys Ile Tyr Phe Asp Arg Lys Arg Arg Ser Asp Pro
            20                  25                  30

Asn Gly Asp Pro Pro Val Ala Thr Asn Ser Phe Thr Leu Ser Val Thr
            35                  40                  45

Val Gln Gln Pro Gln Leu Thr Leu Thr Ala Ala Val Ile Gly Asp Gly
    50                  55                  60

Ala Pro Ala Asn Gly Lys Thr Ala Ile Thr Val Glu Phe Thr Val Ala
65                  70                  75                  80

Asp Phe Glu Gly Lys Pro Leu Ala Gly Gln Glu Val Val Ile Thr Thr
            85                  90                  95

Asn Asn Gly Ala Leu Pro Asn Lys Ile Thr Glu Lys Thr Asp Ala Asn
            100                 105                 110

Gly Val Ala Arg Ile Ala Leu Thr Asn Thr Thr Asp Gly Val Thr Val
            115                 120                 125

Val Thr Ala Glu Val Glu Gly Gln Arg Gln Ser Val Asp Thr His Phe
    130                 135                 140

Val Lys Gly Thr Ile Thr Ala Asp Lys Ser Thr Leu Thr Ala Val Pro
145                 150                 155                 160

Thr Ser Ile Ile Ala Asp Gly Leu Met Ala Ser Thr Ile Thr Leu Glu
            165                 170                 175

-continued

```
Leu Lys Asp Thr Tyr Gly Asp Pro Gln Ala Gly Ala Asn Val Ala Phe
            180                 185                 190
Asp Thr Thr Leu Gly Asn Met Gly Val Ile Thr Asp His Asn Asp Gly
            195                 200                 205
Thr Tyr Ser Ala Pro Leu Thr Ser Thr Thr Leu Gly Val Ala Thr Val
            210                 215                 220
Thr Val Lys Val Asp Gly Ala Ala Phe Ser Val Pro Ser Val Thr Val
225                 230                 235                 240
Asn Phe Thr Ala Asp Pro Ile Pro Asp Ala Gly Arg Ser Ser Phe Thr
            245                 250                 255
Val Ser Thr Pro Asp Ile Leu Ala Asp Gly Thr Met Ser Ser Thr Leu
            260                 265                 270
Ser Phe Val Pro Val Asp Lys Asn Gly His Phe Ile Ser Gly Met Gln
            275                 280                 285
Gly Leu Ser Phe Thr Gln Asn Gly Val Pro Val Ser Ile Ser Pro Ile
            290                 295                 300
Thr Glu Gln Pro Asp Ser Tyr Thr Ala Thr Val Val Gly Asn Thr Ala
305                 310                 315                 320
Gly Asp Val Thr Ile Thr Pro Gln Val Asp Thr Leu Ile Leu Ser Thr
            325                 330                 335
Leu Gln Lys Lys Ile Ser Leu Phe Pro Val Pro Thr Leu Thr Gly Ile
            340                 345                 350
Leu Val Asn Gly Gln Asn Phe Ala Thr Asp Lys Gly Phe Pro Lys Thr
            355                 360                 365
Ile Phe Lys Asn Ala Thr Phe Gln Leu Gln Met Asp Asn Asp Val Ala
            370                 375                 380
Asn Asn Thr Gln Tyr Glu Trp Ser Ser Phe Thr Pro Asn Val Ser
385                 390                 395                 400
Val Asn Asp Gln Gly Gln Val Thr Ile Thr Tyr Gln Thr Tyr Ser Glu
            405                 410                 415
Val Ala Val Thr Ala Lys Ser Lys Lys Phe Pro Ser Tyr Ser Val Ser
            420                 425                 430
Tyr Arg Phe Tyr Pro Asn Arg Trp Ile Tyr Asp Gly Gly Thr Ser Leu
            435                 440                 445
Val Ser Ser Leu Glu Ala Ser Arg Gln Cys Gln Gly Ser Asp Met Ser
            450                 455                 460
Ala Val Leu Glu Ser Ser Arg Ala Thr Asn Gly Thr Arg Ala Pro Asp
465                 470                 475                 480
Gly Thr Leu Trp Gly Glu Trp Gly Ser Leu Thr Ala Tyr Ser Ser Asp
            485                 490                 495
Trp Gln Ser Gly Glu Tyr Trp Val Lys Lys Thr Ser Thr Asp Phe Glu
            500                 505                 510
Thr Met Asn Met Asp Thr Gly Ala Leu Val Gln Gly Pro Ala Tyr Leu
            515                 520                 525
Ala Phe Pro Leu Cys Ala Leu Ala Ile
            530                 535
```